(12) United States Patent
Handman et al.

(10) Patent No.: US 7,403,294 B2
(45) Date of Patent: Jul. 22, 2008

(54) OPTICAL MEASUREMENT DEVICE AND METHOD

(75) Inventors: Daniel F. Handman, Boxboro, MA (US); Forrest S. Stoddard, Amherst, MA (US)

(73) Assignee: Boxboro Systems, LLC, Newton, MA (US)

( * ) Notice: Subject to any disclaimer, the term of this patent is extended or adjusted under 35 U.S.C. 154(b) by 413 days.

(21) Appl. No.: 10/721,773

(22) Filed: Nov. 25, 2003

(65) Prior Publication Data

US 2004/0174542 A1   Sep. 9, 2004

Related U.S. Application Data

(60) Provisional application No. 60/452,745, filed on Mar. 7, 2003.

(51) Int. Cl.
*G01B 11/24* (2006.01)
(52) U.S. Cl. ...................................... 356/601
(58) Field of Classification Search ................ 356/601, 356/622, 139.1, 141.3, 141.5, 153, 154, 400; 73/800
See application file for complete search history.

(56) References Cited

U.S. PATENT DOCUMENTS

| | | | |
|---|---|---|---|
| 3,681,983 A * | 8/1972 | Alexander | 73/186 |
| 3,703,682 A | 11/1972 | Wickman et al. | |
| 3,723,013 A * | 3/1973 | Stirland et al. | 356/152.1 |
| 4,239,963 A | 12/1980 | August et al. | |
| 4,275,599 A | 6/1981 | Kohlenberger et al. | |
| 4,309,618 A | 1/1982 | Carter et al. | |
| 4,334,775 A * | 6/1982 | Breecher et al. | 356/139.03 |
| 4,501,135 A | 2/1985 | Chivens et al. | |
| 4,592,235 A | 6/1986 | Fink | |
| 4,599,711 A | 7/1986 | Cuomo | |
| 4,730,928 A * | 3/1988 | Gabriel et al. | 356/622 |
| 4,798,461 A * | 1/1989 | Pavlin et al. | 356/138 |
| RE33,097 E * | 10/1989 | Moir | 250/559.3 |
| 4,887,087 A | 12/1989 | Clearwater | |

(Continued)

FOREIGN PATENT DOCUMENTS

DE    1938901    2/1971

(Continued)

OTHER PUBLICATIONS

The Cooke Corporation News Release, "Computer Controlled, Optical High Speed Extensometer Meets Demands for Mandatory High-Strain-Rate Testing," Jun. 2003, 1 page.

(Continued)

*Primary Examiner*—Kara E Geisel
(74) *Attorney, Agent, or Firm*—Hamilton, Brook, Smith & Reynolds, P.C.

(57) ABSTRACT

Devices and methods according to the invention allow measurement of deformation of objects by installing on them one or several of lasers or other light sources and a corresponding number of arrays of photo-sensors. The light beams may be shaped so that the response of the sensors may be processed to calculate the bend and twist of the object. By positioning the lasers and sensors in sequence, a cumulative calculation of the deformation is made possible. The applications include anemometry, a variety of blades, buildings, towers and other structures where deformation needs to be measured.

66 Claims, 20 Drawing Sheets

U.S. PATENT DOCUMENTS

| | | | |
|---|---|---|---|
| 4,950,898 A | 8/1990 | Fothergill | |
| 4,962,669 A | 10/1990 | Gernhart et al. | |
| 5,361,854 A * | 11/1994 | Tull et al. | 175/45 |
| 5,365,059 A | 11/1994 | Savage | |
| 5,467,193 A | 11/1995 | Laewen et al. | |
| 5,592,285 A * | 1/1997 | Pund | 356/121 |
| 5,613,442 A | 3/1997 | Ahola et al. | |
| 5,684,596 A | 11/1997 | Eslinger et al. | |
| 5,753,808 A | 5/1998 | Johnson | |
| 5,798,828 A * | 8/1998 | Thomas et al. | 356/141.3 |
| 5,812,251 A | 9/1998 | Manesh | |
| 5,828,059 A | 10/1998 | Udd | |
| 5,837,998 A | 11/1998 | Dinev et al. | |
| 5,974,896 A | 11/1999 | Manzouri | |
| 5,986,749 A | 11/1999 | Wu et al. | |
| 6,308,428 B1 | 10/2001 | Creighton, III | |
| 6,480,655 B1 | 11/2002 | Fisk et al. | |
| 6,571,639 B1 | 6/2003 | May et al. | |
| 6,647,161 B1 * | 11/2003 | Hodge | 385/12 |
| 2002/0162978 A1 * | 11/2002 | Butler et al. | 250/559.33 |

FOREIGN PATENT DOCUMENTS

| | | |
|---|---|---|
| DE | 2043436 | 3/1972 |
| EP | 0 352 464 A1 | 1/1990 |
| EP | 0 845 657 A2 | 3/1998 |
| JP | 60-006811 | 1/1985 |
| JP | 60006811 * | 1/1985 |

OTHER PUBLICATIONS http://www2.noprel.fi/brochures/nms_brochures/bridge22.PDF, "Laser-Based Displacement and Vibration Measurement of the Dynamic Behaviour of Large Structures," Noptel Oy, http://www.noptel.fi.

* cited by examiner

OPTICAL MEASUREMENT DEVICE AND METHOD

RELATED APPLICATION

This application claims the benefit of U.S. Provisional Application No. 60/452,745, filed Mar. 7, 2003. The entire teachings of the above application are incorporated herein by reference.

BACKGROUND OF THE INVENTION

The invention relates to the field of measurement, recording and/or tracking devices used to monitor the deflections and deformations of a variety of objects and structures. Such structures may be aircraft wings, wind turbine and helicopter blades, tall towers, tall buildings and structures, long-bed rail and trucking bodies, tracked vehicles, bridges, tunnels, elevated roadways, amusement park rides, ship and sailboat masts and decks, crane and hoist booms, and utility transmission cables and wires.

SUMMARY OF THE INVENTION

This invention allows testing, measuring, and monitoring of flexible structures. Its embodiments may remain functional when these structures are inaccessible in operation and the measurement system according to this invention may be protected, reliable, and accurate, with a reliable data stream. The sensors and processing electronics incorporated into embodiments of this invention may ride with the structure. This invention may be used where complex deflections are expected in bending and twisting. Embodiments of this invention may be small, light, and flexible enough not to add complicating inertial and stiffness contributions to the structure being monitored. When the deflections are small, the accuracy of the measurement may be better than 1%.

The structures where this invention may be used may have an operational lifetime during which deflections may be monitored and recorded at least at routine intervals, and usually before, during, and after extreme events are encountered. These structures may be in moving frames of reference with respect to ground coordinates, and may also be rotating.

The frequency response of these structure may be very fast, and embodiments of this invention may have the sampling speed at least twice as high following the Nyquist requirement. The maximum deflections of such a structure may be significant to the safety of life and property, and to the structure itself. A long-term measurement system installed on such a structure according to this invention may allow continuous monitoring of the structure and permit constant safety oversight so that an immediate warning is issued when extreme deflections are encountered. A reliable long-term measurement system according to this invention allows continuous monitoring and provides immediate knowledge of an impending extreme deflection, allowing the designers to plan countermeasures appropriate to the structure and its operating control system.

Certain embodiments of this invention include methods and apparatuses for determining changes in the shape of an object. An electromagnetic radiation source coupled to the object emits a shaped beam and an array of electromagnetic radiation sensors coupled to the object receive radiation from the radiation source. The source, which may be, for example, a laser or an electromagnetic-radiation-emitting diode or be a combination of several such sources, may emit infrared, visible, or ultraviolet light or other types of electromagnetic radiation. An electromagnetic radiation focusing device may be positioned between the electromagnetic radiation source and the array of electromagnetic radiation sensors. Responses of the sensors indicate angular orientation of the shaped beam with respect to the array or a displacement of the shaped beam with respect to the array; a processor processes the responses of the sensors to determine bend and twist of the object. The shaped beam may have a substantially cross-shaped cross-section. The array of electromagnetic radiation sensors may be non-linear.

The possible objects include but not limited to airplane wings, helicopter rotors, bridges, towers, buildings, electric transmission lines and cranes. Embodiments of this invention may be used as test devices to verify loads and deflections on a variety of large industrial machines. Other applications of this invention include anemometry and generally fluid flow measurements.

The methods and apparatuses embodying this invention may further use several electromagnetic radiation sources coupled to the object and several arrays of electromagnetic radiation sensors coupled to the object receiving radiation from the sources, responses of the sensors indicating orientation of the radiation beam with respect to the arrays. These embodiments provide a combined indication of changes in the shape of the object. The radiation beams may be axially displaced and substantially parallel and co-directed or counter-directed.

Embodiments of this invention also include methods and apparatuses using an electromagnetic radiation source coupled to the blade, the electromagnetic radiation source emitting a radiation beam, and an array of electromagnetic radiation sensors coupled to the blade to receive radiation from the radiation source. Responses of the sensors indicate orientation of the radiation beam with respect to the array.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1A:
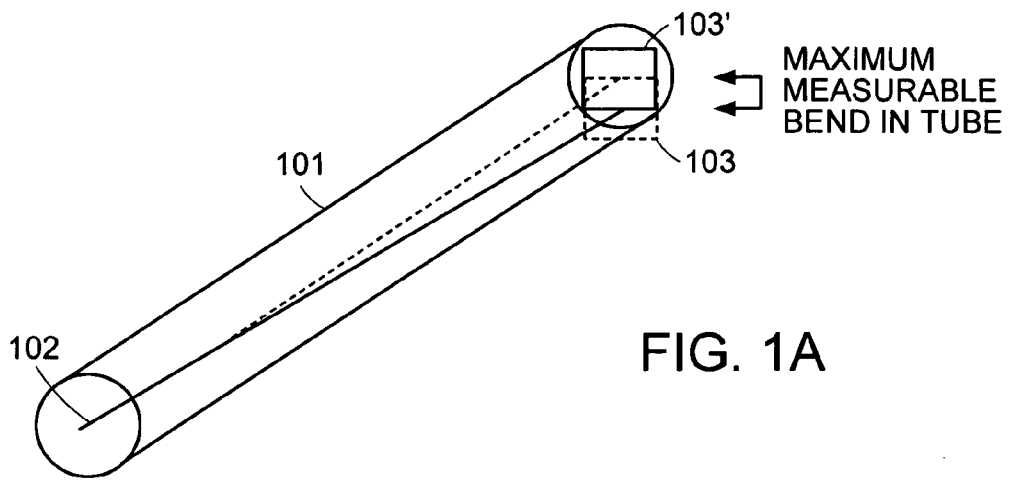
FIG. 1A is a schematic illustration of dependence of measurement resolution on the length of a sensor tube.

A description of preferred embodiments of the invention follows.

One embodiment of the present invention is an optical-based, hermetically-sealed, laser-photosensor array package inside a small, long, flexible tube that may be installed along the long axis of any moving structure. The tube may either be inside or outside the structure, and may be retrofitted to practically any long moving structure. The sensor array package is capable of measuring bending deflections in two directions and angular deflections to less than 1% sensitivity, and has a redundant sensor data source with an internal physical and electronic self-checking system to verify the data stream.

The photosensor array sizes and the distance from the lasers to the photosensor arrays may be optimized based on the measurement requirements. This allows the tube to be tailored for the intended structure, having a larger lateral dimension for situations requiring a longer length which has small deflections, or a smaller dimension for situations requiring a shorter length having large deflections. The tube consists of many such sensor pairs of varying diameter depending on the deflection curve and interior tube access.

Electronic components inside the tube communicate with electronics outside the tube by means of a two-wire RS485 link or other multi-drop serial communication method, enabling the monitoring terminal to be some distance from the operating structure. Multiple output paths may be added to allow multiple and redundant monitoring destinations. The RS485 cable may also be easily routed through communication slip rings to provide data access to rotating structures. Sensor power may be provided in the same cable as the communication wires, requiring only 4 wires to form the power and communications bus that is daisy-chained to each laser-sensor array.

Embodiments of this invention may use off-the-shelf, mass-produced electronics, sensors, lasers, and diodes which are in wide use in other industries, and available from multiple industry sources. These components have already been thoroughly tested in long-term extreme environments and are available in military specification quality; therefore the invention allows achieving long life and reliable accuracy of its embodiment.

Some embodiments include one or more sensor pairs. A sensor pair is a combination of a laser light source, an array of photo-sensors, and accompanying electronics. A sensor pair is impervious to g-forces and complex motions. Such a sensor-laser arrangement has no degradation with time as do alternative strain gage or piezoresistive instruments. There is no drift or zeroing or calibration needed as for analog or mass-inertial sensors. One can expect a long lifetime of components, on the order of many years. Embodiments of this invention using the serial tube architecture are accurate with even the very common 5-mm photosensor width which is the least-cost photocell. Furthermore, the sensor pair resolves the linear deflections and angular twist via redundant sensor paths, so these embodiments have built-in error checking.

The tube architecture permits simple setup for some embodiments since the calibration may consist of simply aligning the data output to be a straight line when the beam structure is at rest. Additionally, the sensor pair has a response time limited only by the processor and communications channel speed, which will be much faster than the natural frequencies of a long, live beam. The sensor system can provide real time data to the operator and to the control system for the structure. This is an important feature since it allows the operator/controller to predict structural motions and to institute mitigating actions. This is the case with the rotating wing or wind turbine blade, which has pitch angle control or other means to regulate the load on the wing or blade.

Figure 1B:
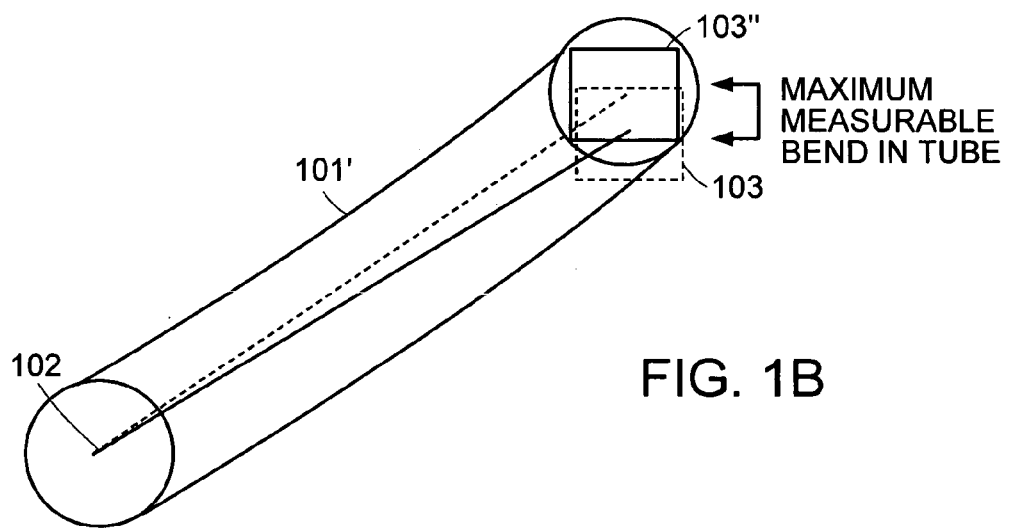
FIG. 1B is a schematic illustration of dependence of measurement resolution on the length of a sensor tube.
Figure 1C:
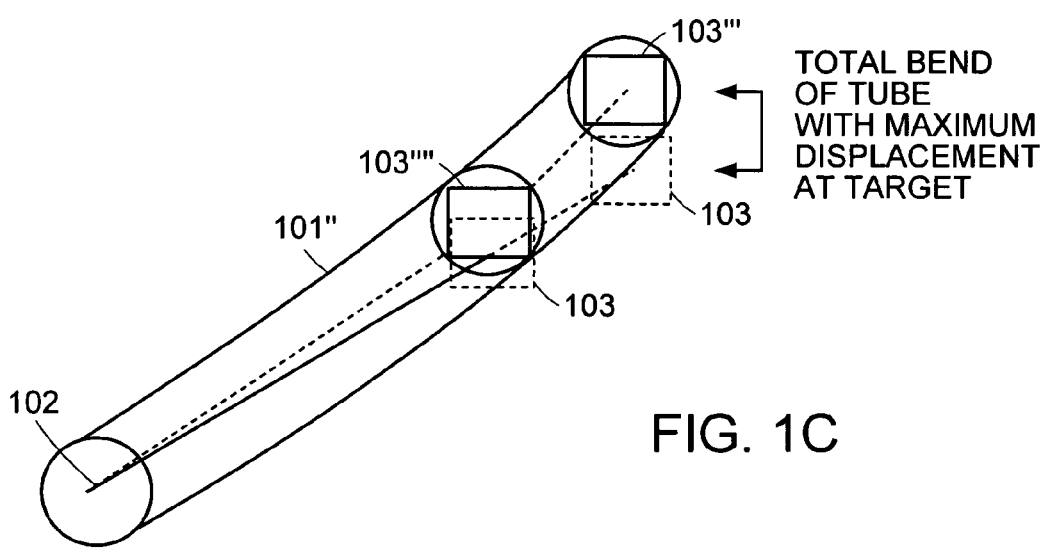
FIG. 1C is a schematic illustration of dependence of measurement resolution on the length of a sensor tube.

FIGS. 1A, 1B, and 1C show a single laser-sensor pair used for embodiments performing single segment measurements. The shown embodiments use a laser 102, and a sensor target 103 within a variety of flexible tubes 101, 101', and 101'''. The measurable amount of bend depends on the length of the tube and on the position of the target 103 within it, as may be seen from the shown maximum-bend positions of the target 103', 103", 103''', and 103"". The amount of bend measurable by a pair is proportional to the size of the target divided by the distance from LED to the target. A greater bend would cause the radiation emitted by the source 102 to hit the tube's walls.

For embodiments using multi-segment measurements, each segment may have a forward and rearward facing laser-sensor pairs. Each end of a segment in such a multi-segment measurement system has a laser and sensor array.

Figure 2:
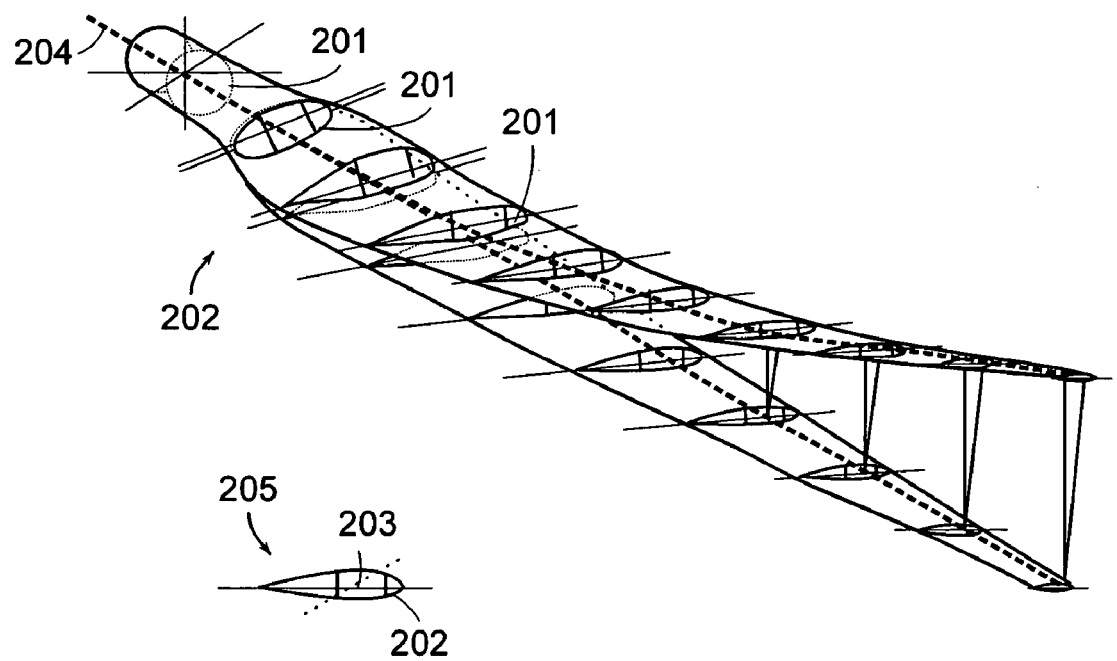
FIG. 2 is an isometric view of a windmill blade with a sensor tube and an external display

FIG. 2 shows an embodiment of this invention as a tube 204 containing multiple segments 201 installed inside a large (40-m) wind turbine blade 202. The tube 204 may be attached to the inside spar of the blade 202 during construction, or may be inserted and bonded to the inside spar after the blade 202 is built. The tube 204 is constructed of a durable, flexible material such as PVC tubing, which provides environmental protection and interior darkness in long-term service. The tube 204 conforms to the deflected shape of the wind turbine blade 202 while it is operating. The tube 204 is light in mass and is flexible, so no external loading is introduced into the blade spar to which it is attached. Each laser-photosensor pair inside the tube 204 measures the deflections and twist of the tube section 201 containing the pair. The power and RS485 communication cable is daisy-chained from pair to pair along the tube 204. The deflections and twists at each pair station are sent to the recording and display terminal 205 from the RS485 serial port.

The wind turbine blade embodiment in FIG. 2 employs full three-dimensional capability of the sensor tube. Blade deflections in flap (Y-direction), lead-lag (Z-direction) and twist are recorded all along the blade at each segment. In the embodiment shown in FIG. 2, there are ten such sensor segments 201, one at each one-tenth span station of the blade 202. The real time display 205 shows the actual deflected shape of the wind turbine blade 202 while it is operating on a wind turbine, in any weather or power output condition, or in any transient event such as a gust. FIG. 2 shows such a display frame 205. Essentially the tube sensor array presents to the wind turbine operator the entire moving shape of the blade 203 while it is operating in any condition.

The display 205 is implemented using a computation device such a computer or a processor with inputs providing the data from sensors and with a visual display 205 providing information about the deformation.

The accuracy of the tube sensor array is better than 1% in linear deflection as is shown by analysis below. For the wind turbine blade in FIG. 2, this means the total error in tip deflection for this case is only 3.1 inches (0.08 m) with the maximum load tip deflection of this blade being 315 inches (8 m). Likewise the accuracy in elastic twist or total angular deflection of the blade is 0.04 degrees (2.4 minutes of arc) out of the total elastic twist of 3.58 degrees at the blade tip.

Figure 2A:
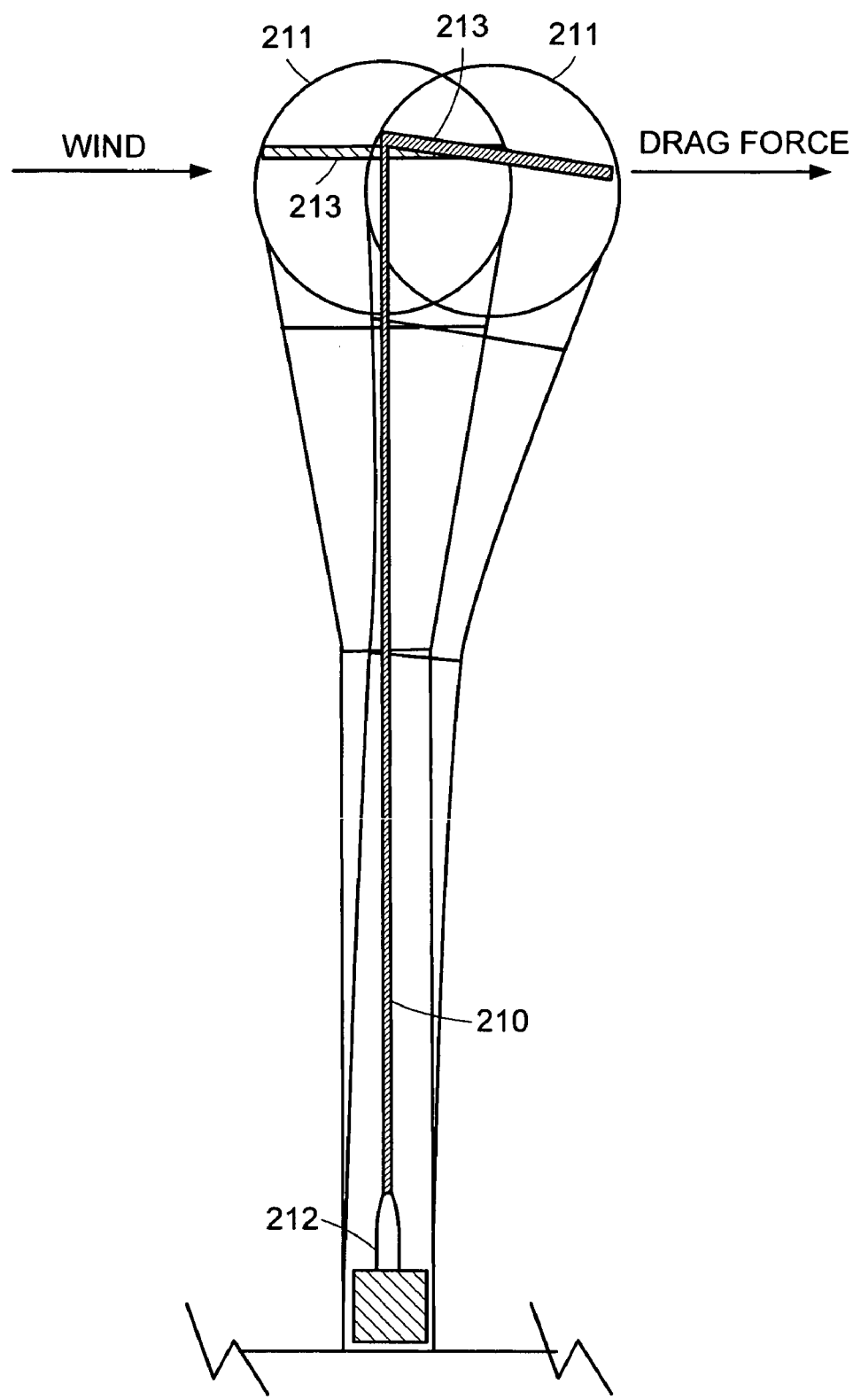
FIG. 2A is an embodiment of this invention as an anemometer.

FIG. 2A shows an embodiment of the present invention used as an anemometer or for measuring the speed and direction of any fluid. This approach to measuring wind speed has some advantages. First, there are no moving parts to wear out. The vertical tube 210 simply bends according to the drag force produced by the wind. The spherical fairing 211 acts to increase the drag force and localize it at the extremity of the sensor tube 210. Second, the basis of the measurement is an LED 212 and photosensor array 213, and they are more durable and reliable than propellers, magnetos, gears, brushes, strain gages, hot wires, or any other current anemometry transducer. Third, this instrument is very light and inexpensive, even if injection molded parts are used. Fourth, the instrument is impervious to gravity, so it may be mounted in any orientation (vertical is shown). If mounted horizontally, the drag on the spherical fairing 211 has a component in the direction of the upflow of the wind. This allows measurement of the vertical component of the oncoming wind. When mounted as the third part of a triaxial arrangement (3 sensors), this embodiment measures all three wind speed components: horizontal, vertical, and lateral.

This instrument may be used to measure any flow. It may be placed in a pipeline or piping system to measure air, gas, or fluid flow. An embodiment of this invention may be used to measure the speed and direction of the movement of a vessel through water. A dual- or tri-axial embodiment of the invention may be used in marine engineering to measure cross currents and upwelling currents.

Figure 2B:
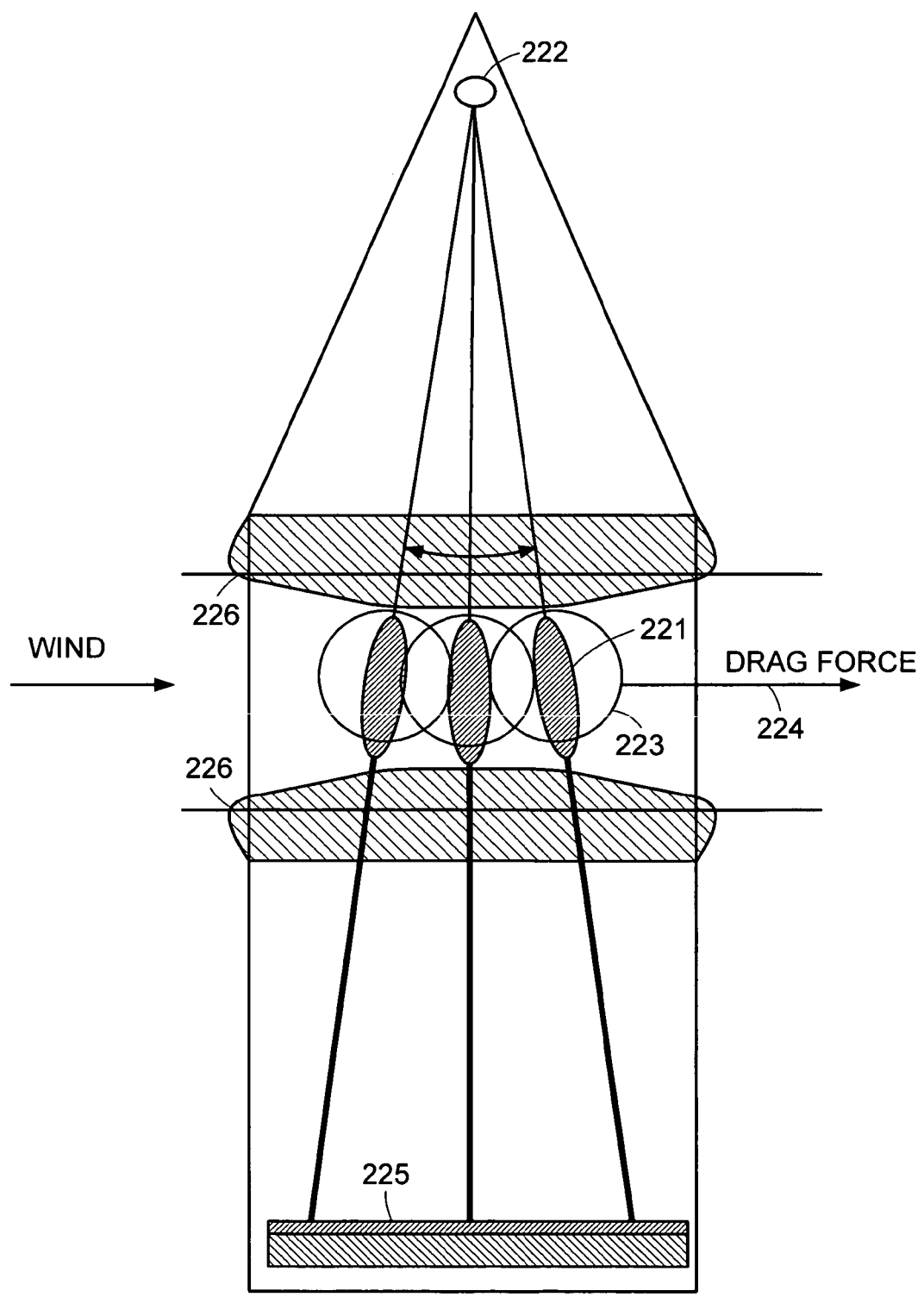
FIG. 2B is another embodiment of this invention as an anemometer.

FIG. 2B shows another embodiment of this invention used as an anemometer. In this embodiment, the LED unit 221 is suspended on a wire from a universal bearing 222 and is allowed to swing in response to wind speed. The drag force 224 on the spherical housing causes an offset on the target photosensor array 225. This embodiment has an annular port 226 with a molded venturi entrance. This serves to smooth the airflow and increase the airspeed over the spherical fairing 223, thus increasing the sensitivity of the instrument. There are no moving parts in the mechanical sense, and the instrument is completely digital. This embodiment is mounted vertically, since gravity is used for the pendulum action.

Figure 3A:
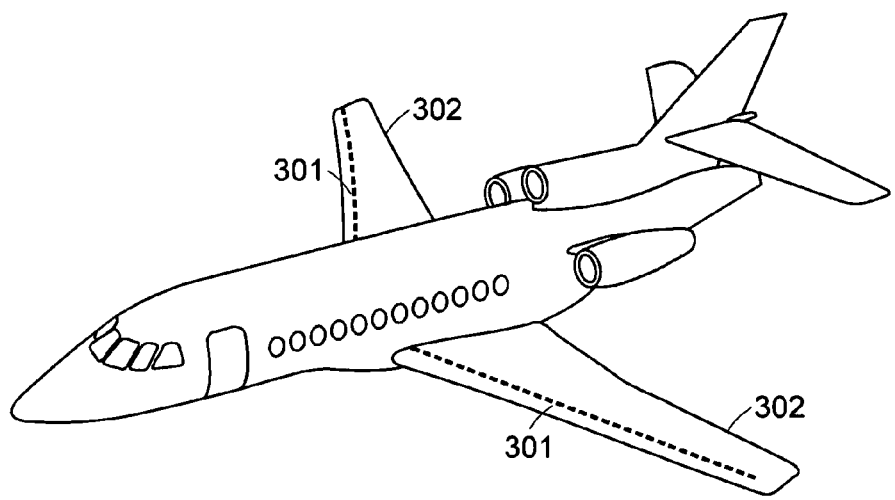
FIG. 3A is an illustration of use of embodiments of this invention on a plane.
Figure 3B:
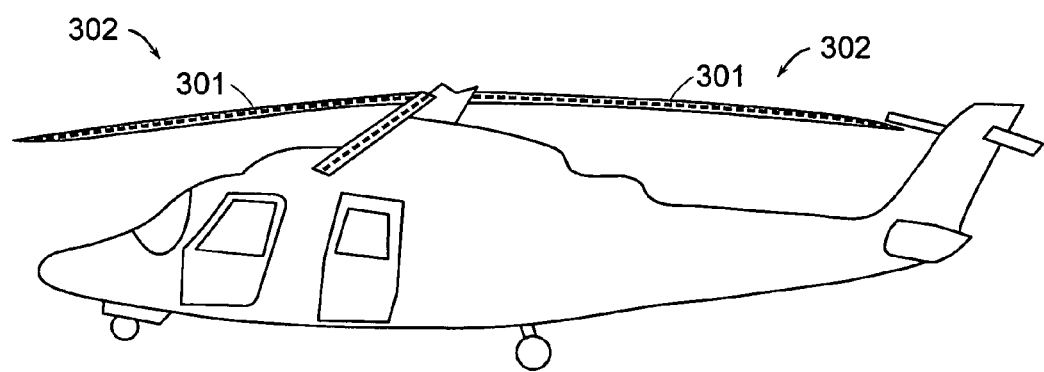
FIG. 3B is an illustration of use of embodiments of this invention on a helicopter.

FIG. 3A shows another embodiment of this invention using a multi-segment tube sensor 301 along the wing spar of an aircraft 302. FIG. 3B shows a similar use of an embodiment of this invention along a helicopter blade 303. Such deflection information is important to the pilot, especially during extreme maneuvers or with overload threshold flight. Such information is also important to the designer to ascertain wing load and shape during design missions.

Figure 4A:
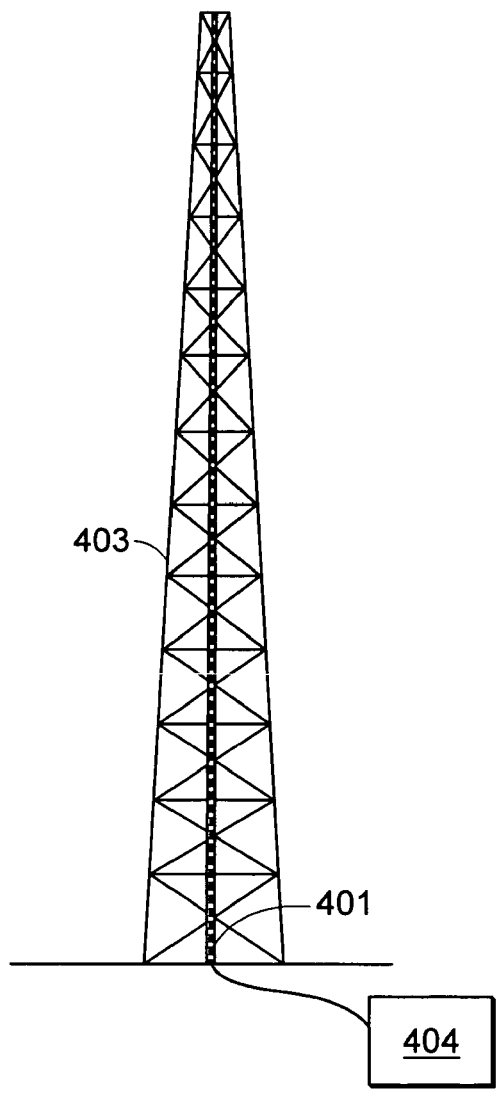
FIG. 4A is an illustration of use of an embodiment of this invention on a tower.
Figure 4B:
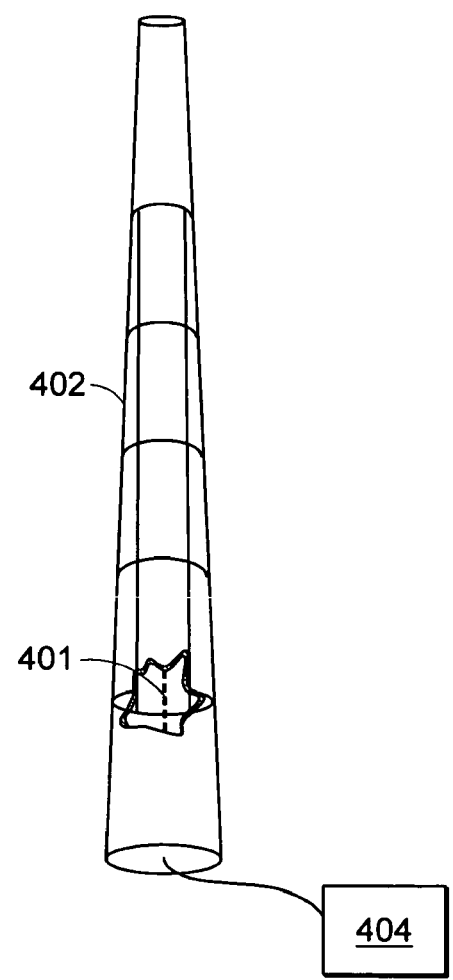
FIG. 4B is another illustration of use of an embodiment of this invention on a tower.

FIGS. 4A and 4B show another embodiment of this invention using a multi-segment tube sensor 401 on a communications towers 402 and 403. The tube 401 is deployed vertically from the foundation to the tower top. The tower may be a guyed tower, 403, or self-standing, 402, but the principle is the same. For the guyed tower 403 a special consideration is the verticality of the tower 403 while it is being erected, and the possibility of guy wires loosening over time. The sensor 401 solves both these issues. The sensor 401 checks and verifies the verticality of the complete tower 401, including kinks or bends along its height which may be indicative of loose guy wires, broken flanges, loose bolts, or other causes, all of which are problematic for the structure 402. A display 404 also displays the complete dynamic motion of the tower 402, which is useful to the tower designers. Since the sensor 401 may be set up while the tower 402 is being built, the display 404 may be used by the installer to provide the initial verticality specification.

Figure 5A:
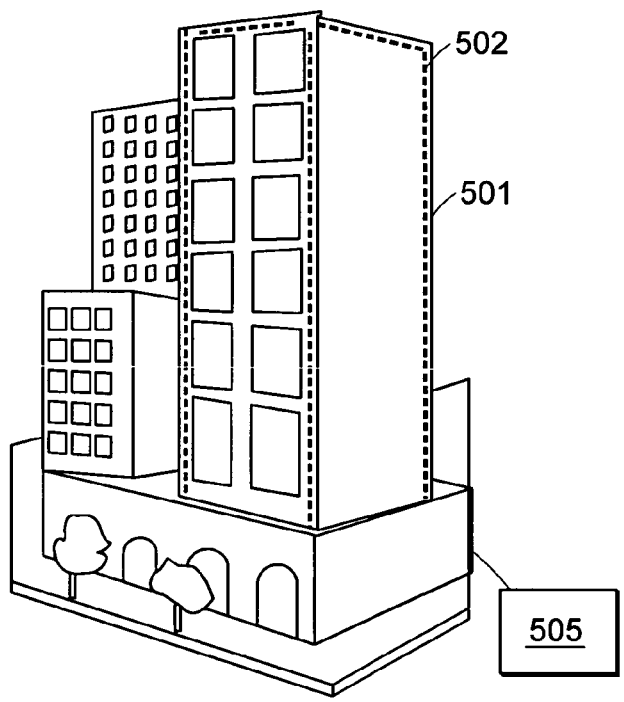
FIG. 5A is an illustration of use of embodiments of this invention on buildings.
Figure 5B:
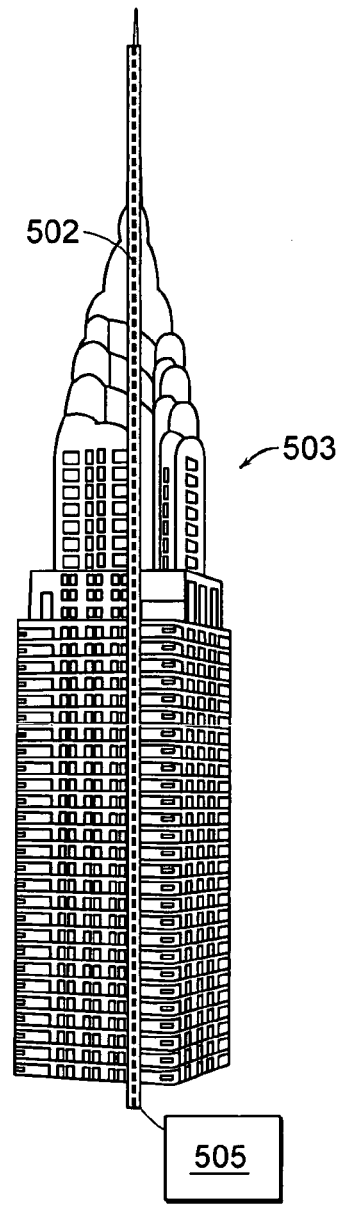
FIG. 5B is an illustration of use of embodiments of this invention on buildings.

FIG. 5A shows another embodiment of this invention using a multi-segment tube array 502 inside an elevator shaft of a building 501. FIG. 5B shows an embodiment installed in vertical supports of a buildings 503. A display 505 shows the dynamic motion of the columns, and thereby the overall building motion. This is critical information to the architects and civil engineers to ascertain the structural effects due to wind loading and seismic loads. The display 505 also provides early warning in case of any structural failure in the buildings 501 or 503 which would cause bending in the support columns. For example, in the case of a fire on an upper floor, the sensor array displays via the display 505 to firefighters the structural integrity of the upper floors before they are breached.

Figure 6A:
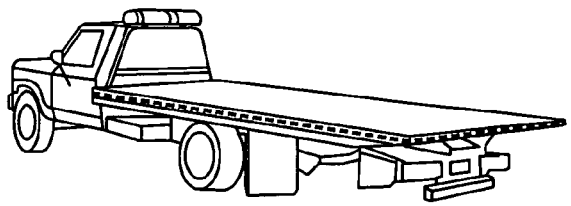
FIG. 6A is an illustration of use of an embodiment of this invention on a truck.
Figure 6B:
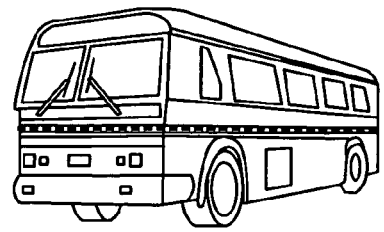
FIG. 6B is an illustration of use of an embodiment of this invention on a bus.
Figure 6C:
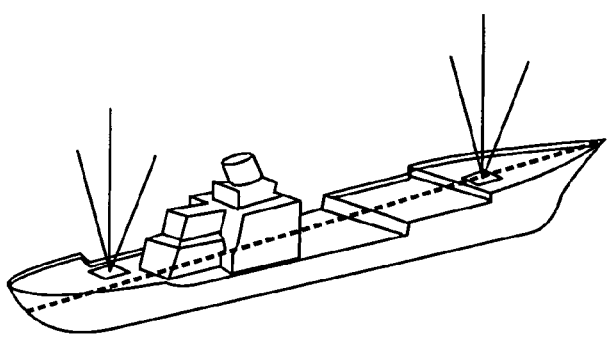
FIG. 6C is an illustration of use of an embodiment of this invention on a ship.
Figure 6D:
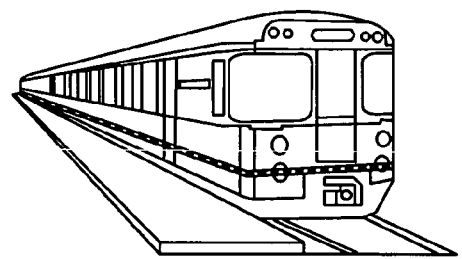
FIG. 6D is an illustration of use of an embodiment of this invention on a train.
Figure 6E:
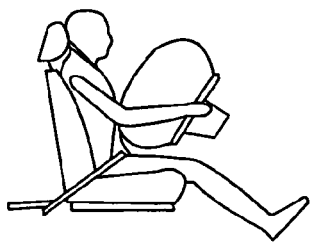
FIG. 6E is an illustration of use of an embodiment of this invention within an air bag deployment system.
Figure 6F:
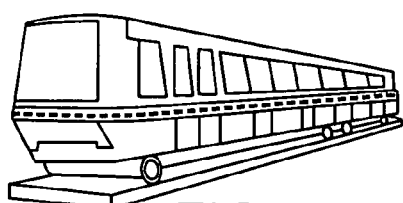
FIG. 6F is another illustration of use of an embodiment of this invention on a train.
Figure 6G:
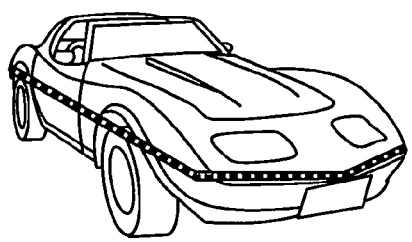
FIG. 6G is an illustration of use of an embodiment of this invention on a car.

FIGS. 6A and 6G show an embodiment of this invention employed along the body of a vehicle. In this case, the display gives the operator the dynamic motion of the vehicle frame during operation. This is useful for the cases of loading capacity, sway, and possible resonance during motion, and in the design stage for structural optimization. An embodiment of this invention may be used in a similar manner on a bus, as shown in FIG. 6B. Another embodiment of this invention may be used on a ship to monitor its structural integrity as shown in FIG. 6C, where it is deployed along the length of the ship. An embodiment of this invention may also be used on a train to monitor its frame during operation as shown in FIGS. 6D and 6F. Another application of an embodiment of this invention is shown in FIG. 6E, it is used as a part of an air bag safety system for monitoring the condition of the vehicle to help determine the moment of air bag's deployment.

Figure 7A:
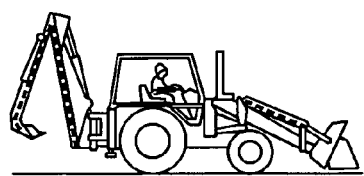
FIG. 7A is an illustration of use of embodiments of this invention on an excavator.
Figure 7B:
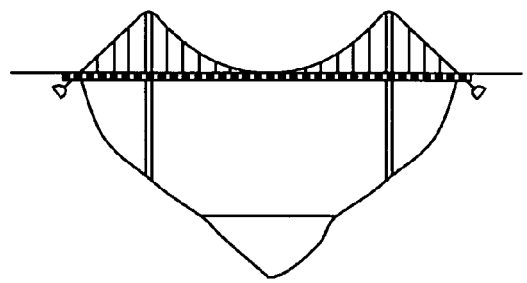
FIG. 7B is an illustration of use of embodiments of this invention on a bridge.
Figure 7C:
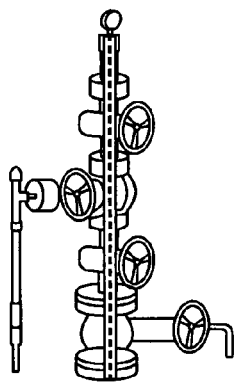
FIG. 7C is an illustration of use of embodiments of this invention on a fluid conduit.
Figure 7D:
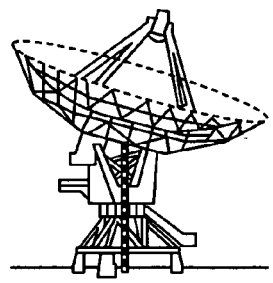
FIG. 7D is an illustration of use of embodiments of this invention on a dish antenna.
Figure 7E:
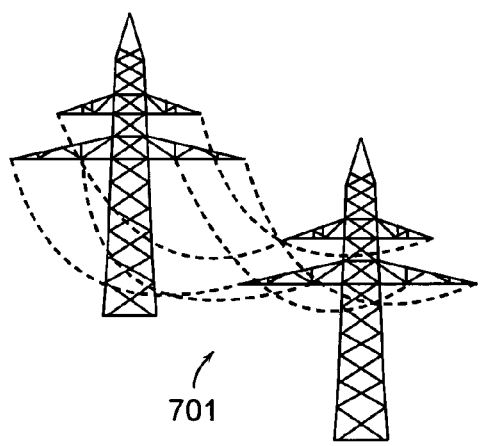
FIG. 7E is an illustration of use of embodiments of this invention for utility line sag monitoring.

FIGS. 7A-7F show an embodiment of this invention employed in civil engineering structures. It may be used along a utility high-tension transmission line 701, as shown in FIG. 7E. These lines are subject to sag and sway, depending on the wind, weather and icing conditions and how much electrical current is being carried in the line. Limits are placed on the amount of sag and sway which can be allowed, depending on the structural integrity of the tower supports, connectors, and proximity to other lines. The sensor array display gives the utility operators a continuous monitor of the actual motion of the lines, permitting them to reduce or increase the current (capacity) of the line depending on the actual sag being measured. It also serves as an early warning device to the utility if undetected damage or loads (such as icing) are present on remote lines.

Figure 7F:
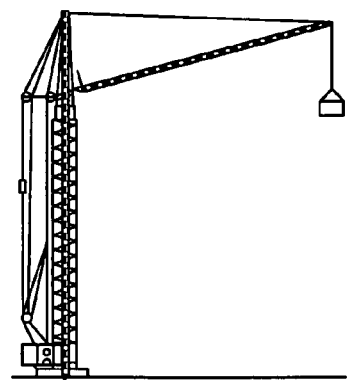
FIG. 7F is an illustration of use of embodiments of this invention on a construction crane.

FIG. 7A is an illustration of use of embodiments of this invention on an excavator to monitor its structural integrity. FIG. 7B is an illustration of use of embodiments of this invention on a bridge for monitoring its deformations. For similar purposes this invention may used on FIGS. 7C, 7D, and 7F. FIG. 7C is an illustration of use of embodiments of this invention on a fluid conduit. FIG. 7D is an illustration of use of embodiments of this invention on a dish antenna. FIG. 7F is an illustration of use of embodiments of this invention on a construction crane.

Figure 8:
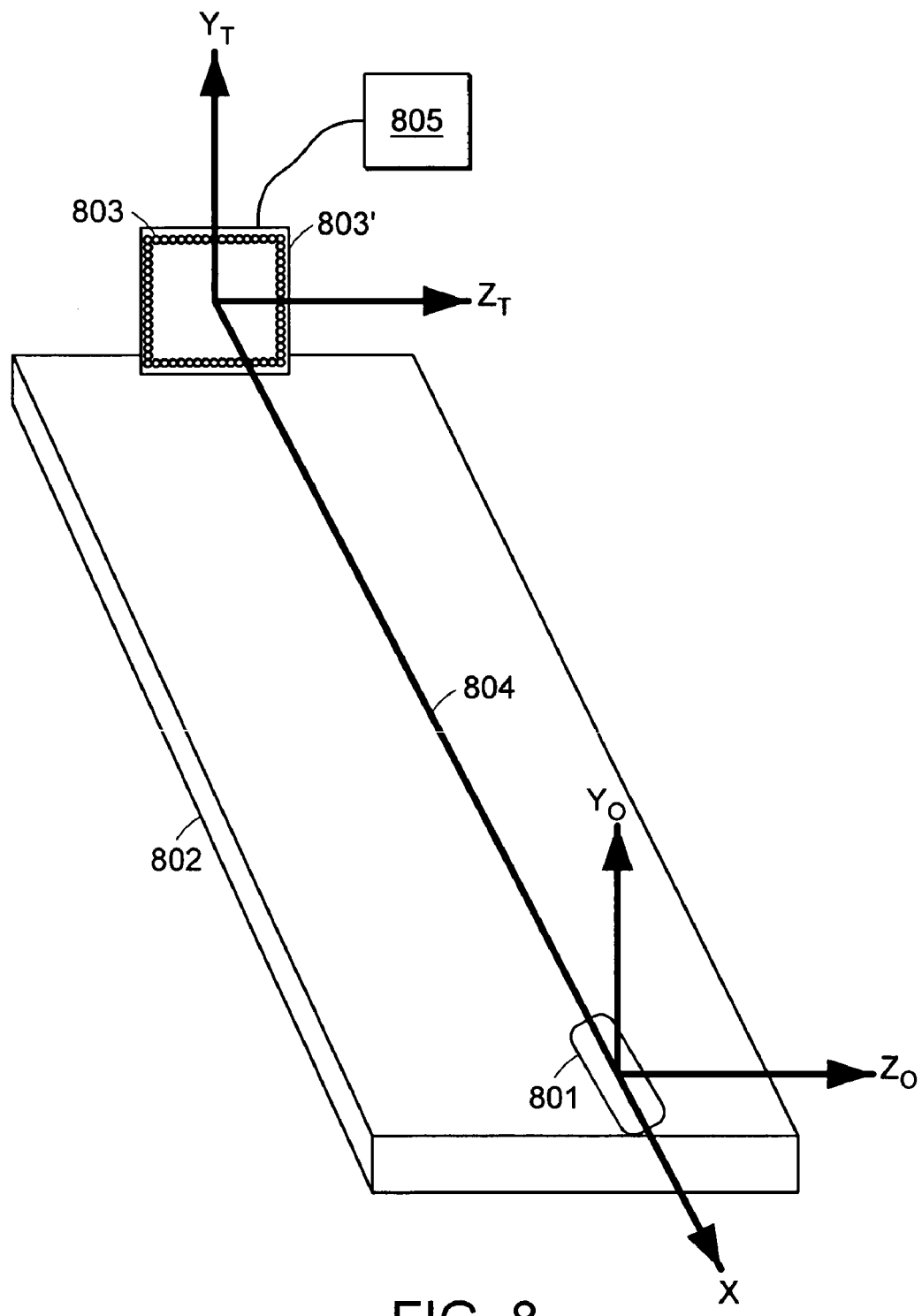
FIG. 8 is a diagram showing an embodiment of this invention as a sensor pair.

FIG. 8 gives a schematic view of a single segment sensor pair in isometric view. Two points along the length (X-axis) of a mechanical beam 802 may move relative to each other in the Z-axis and Y-axis directions. In addition, the beam 802 can twist about the X-axis, providing an angular displacement. The relative displacements and angular twist about the X-axis may be measured as follows:

A laser or a light-emitting diode (LED) 801 is rigidly mounted on one end of the mechanical beam 802. An array of photo-sensors 803 is mounted on a target 803' which is rigidly attached to the other end of the beam. The laser or LED 801 projects, for example, a cross-hair shape on the target 803. Any convenient laser shape can be configured with the proper optics.

While the mechanical beam 802 is at rest, the laser beam 804 is aligned along the X-axis so that the center of the cross-hair hits the center of the target 803'. As either end of the mechanical beam 802 moves with respect to the other end of the beam 802, different photo-sensors in the array 803 are illuminated. By monitoring which photo-sensors are illuminated by the laser beam 804, a microprocessor 805 coupled to the sensors may determine the Z and Y deflections between the two points and the angular twist about the X-axis.

When a segment is used for measurements, one laser (at one end of the segment) and one optical sensor array (located at the other end of the segment) is enough to measure bending and twist of the segment. However, a segment may have lasers and sensor arrays at both ends in order to calculate the exit angle or tangent of the bent beam at the end of the segment. When the exit angles of each segment are known, the positions of the ends of all joined segments with respect to the coordinate system at the beginning of the segments may be calculated.

Figure 9:
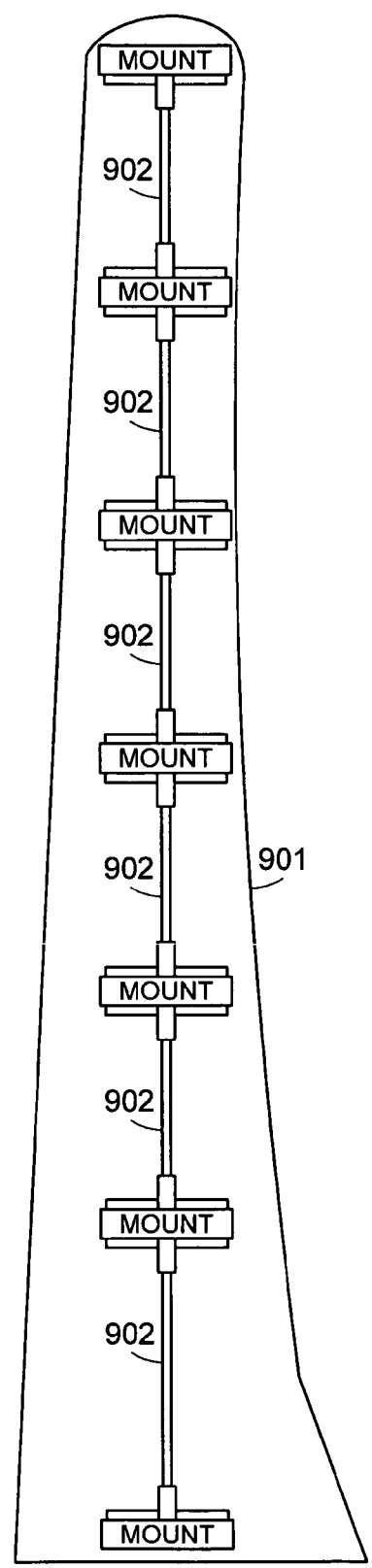
FIG. 9 is an illustration of an embodiment of this invention used on a wing.

FIG. 9 shows an embodiment of this invention as a wing 901 with multi-segment sensor pairs at opposite ends of tubes 902. Multiple laser/sensor pairs may be mounted inline on or inside a long beam. The outputs of the sensor array/laser pairs may be combined to determine the overall deflection and twist of the long mechanical beam. Deflection and twist data are available at every laser location. FIG. 9 shows such an installation on an airplane wing or wind turbine blade. Such an array of sensors could be mounted outside the wing structure for bench testing, or inside the wing for testing during flight operation.

The sensor arrays and laser diodes may be mounted in tube sections to provide environmental protection, darkness, and a means of mounting to the structure to be measured. Multiple tube sections may be fitted together to make a measurement system of any length. Different size sensor arrays, and different length tubes, may be assembled together to form an optimum solution for different structural beam geometries and bending characteristics. Sections of the beam with high deflections may be of larger diameter or have more photosensor arrays. Another way to achieve the necessary resolution is to keep the laser beam inside the target area is to use shorter pairs, or shorter distances between the laser and the array. Sections of the beam with smaller deflections may use smaller arrays or longer distances between the laser and the array. These principles are depicted in FIG. 1.

Figure 10:
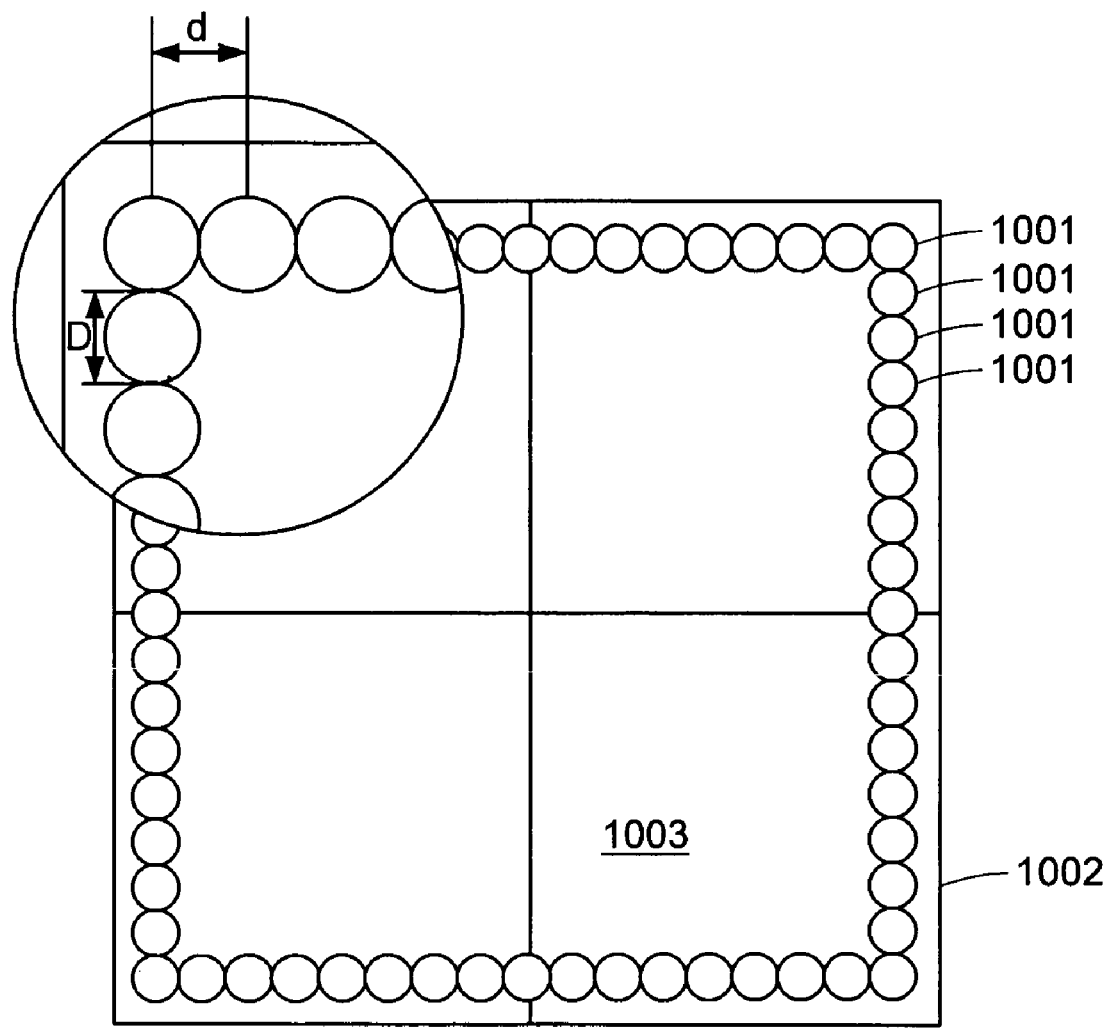
FIG. 10 is an illustration of a sensor target array used in some embodiments of this invention.

FIG. 10 gives a schematic view of a sensor target array 1002 used in some embodiments of this invention, showing the photo-diode diameter D and the spacing d. In the figure, since the photo-diodes 1001 are touching, D and d are equal; but in other embodiments the photo-diodes 1001 may have space between them and in such embodiments d is some number larger than D. The sensors 1001 may be arranged in a rectangle, a circular pattern, or any other shape. The sensor array 1002 may be fabricated using standard printed circuit board techniques. A power supply, microprocessor, sensor biasing and buffering circuits, and communications driver circuits may be mounted on the printed circuit board 1003. The microprocessor monitors the sensors illuminated by a laser or a LED, and report the information to a master processor via a multi-drop communications system such as RS485. With half duplex RS485 communications, four wires (two for power, two for communication) are daisy-chained to all the sensor printed circuit boards 1003. A master controller supplies power to, and communicates with each sensor printed circuit board 1003. The master controller collects the deflection information from each sensor 1001 and calculates the total deflections and twist.

Figure 11:
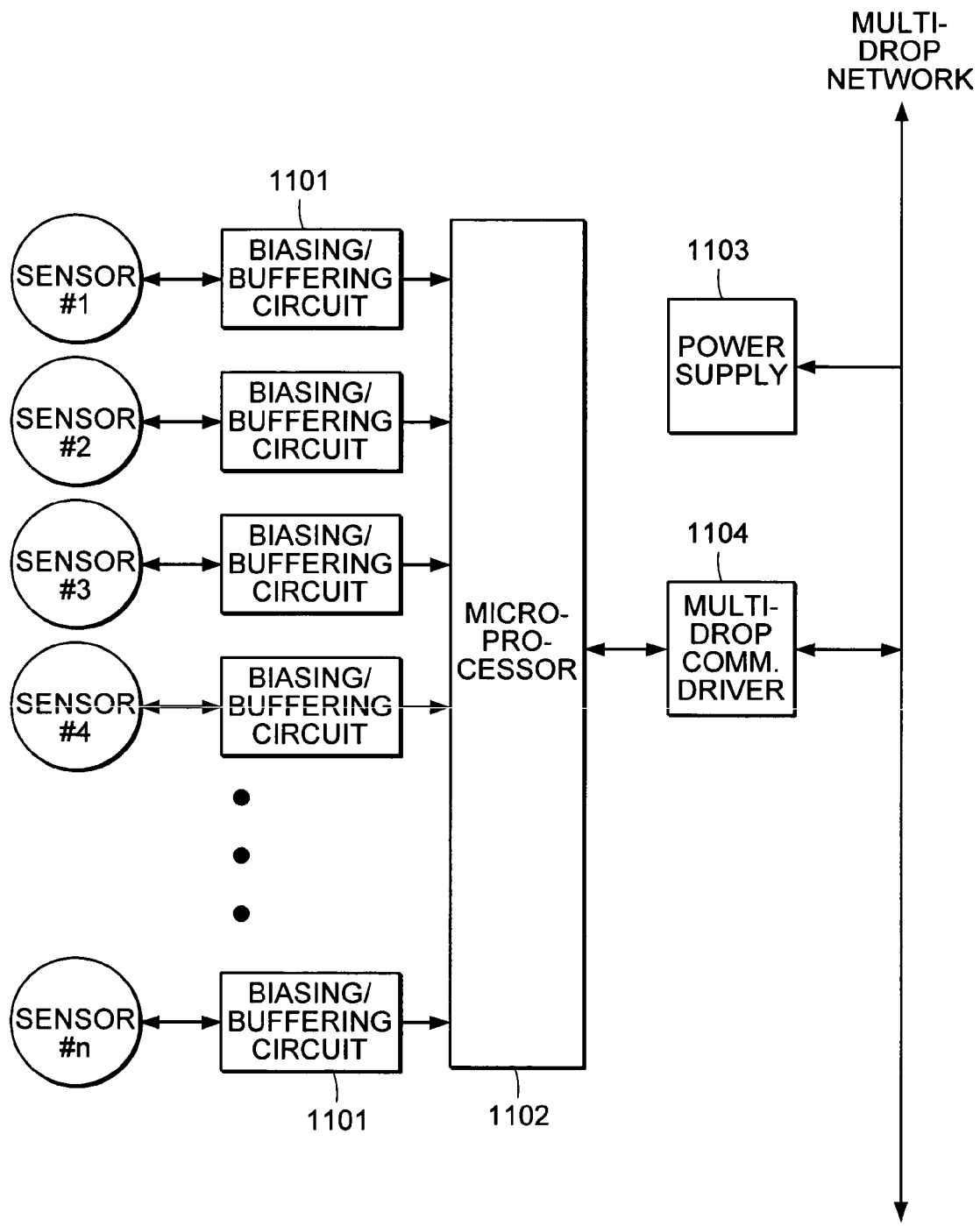
FIG. 11 is a schematic view of a sensor circuit block used in some embodiments of this invention.

FIG. 11 is a schematic view of a sensor circuit block used in some embodiments of this invention, including the necessary electronic circuits 1101, the microprocessor 1102, power supply 1103, and the communications link 1104.

Figure 12:
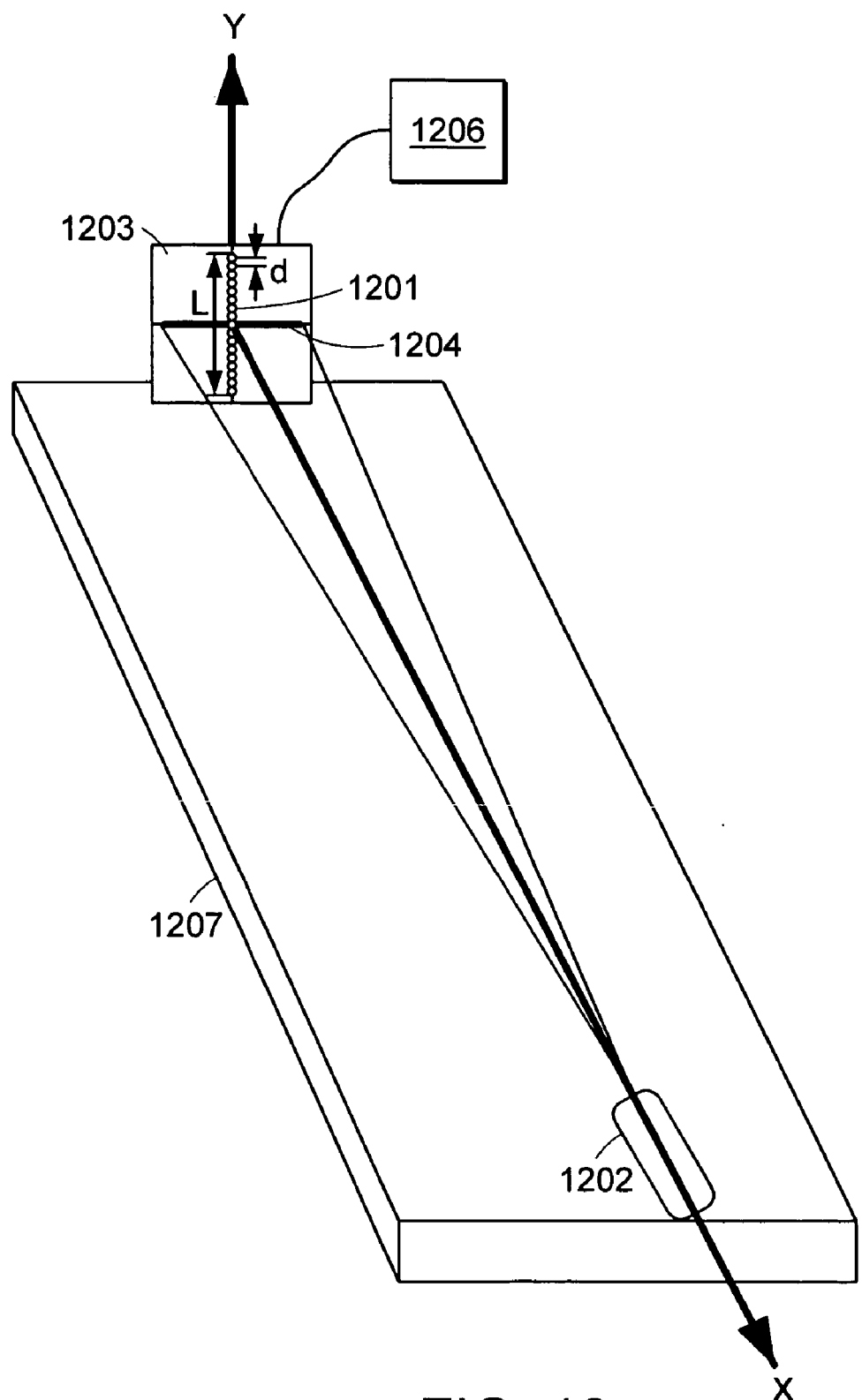
FIG. 12 is an illustration of an embodiment of this invention.

FIG. 12 is a view of the operation of an embodiment of this invention involved in single-axis measurement, requiring only a single line of sensors 1201 as the target array. The beam 1207 may be a section of a blade.

For a 3-axis measurement (Z, Y, θ), a two dimensional array of sensors is needed, as depicted in FIG. 10. However, for a single axis bending measurement, only a single line of sensors is required. In FIG. 12, the laser optics 1202 is arranged to project a horizontal line instead of a spot or cross-hairs.

Many photosensor technologies are suitable for embodiments of this invention. Cadmium Sulfide (CdS) photo-sensors are available from several manufacturers, for example CdS photoconductive cell P687-02 from Hamamatsu Corporation. An example of a photo-diodes usable in embodiments of this invention is HSDL-5420 from Agilent Technologies. Note that the photo-diodes used in embodiments of this invention may operate not only in visible part of the electromagnetic spectrum, but outside of it as well. For more tightly packed sensor arrays, CMOS linear image sensors may be used, for example, S8377-512Q (512 sensors over 25.6 mm) or S8378-1024Q (1024 sensors over 25.6 mm) from Hamamatsu Corporation. The buffering circuits are used for converting the output signal to logic levels to be read by a microprocessor. The sensor technologies may be selected to respond to either infrared or visible light. The technologies are available in working temperature ranges of at least −20° C. to +60° C.

For compact packaging, a laser diode module may be mounted to the back of the sensor array printed circuit board. Laser diode modules, such as Lasermate Group Inc.'s PLP635, are available with cross-hair and line-generating optics. The laser diodes may use the same power supply as the microprocessor and sensor electronics. Laser diodes are available in visible and infrared wavelengths. Visible wavelengths simplify aligning the system during installation.

As shown in FIG. 12, for a single segment, single axis measurement the photo-sensors 1201 may be arranged in a vertical line on the sensor printed circuit board 1203. The laser 1202 projects a horizontal line 1204 perpendicular to the line of photo-sensors 1201. If bending is expected in both the +Y and −Y directions, the laser 1202 is aligned, at zero bending, to cross the center of the line of photo-sensors 1201. If the length of the line of sensors 1201 is L, then deflections may be measured in the range of −L/2 to +L/2.

If bending is expected in only one direction, for example, in the +Y direction, then the laser 1202 is aligned to cross the sensor array 1204 at the maximum −Y point, allowing twice the deflection to be measured. If the length of the line of sensors 1201 is L, then deflections may be measured in the range of 0 to +L.

A larger deflection range may be obtained using two light lines. A laser may project two parallel lines according to its optics. Alternatively, two lasers, each projecting a single line, may be used to project two parallel lines. Then one laser may be aligned to cross the top of the line of sensors 1201, while the other may be aligned to cross the bottom of the line of sensors 1201. Therefore, as long as the deflection is within the total length of the line of sensors 1201 in either direction, the microprocessor may resolve the deflection. If the length of the line of sensors is L, using two lasers, or a laser that projects two parallel lines, a total deflection of −L to +L may be measured, thereby doubling the sensor range.

Referring to FIG. 12 again, the photo-diodes' diameter is d and the spacing is also d. For photo-sensors with a package diameter of d, spaced at a center-to-center distance of d, the laser optics is adjusted to project a line width of d 1204 at the expected distance L between the laser 1202 and sensors 1201. The line 1204 projected by the laser 1202 may be centered on one photosensor, or partially on each of two adjacent sensors. If only one sensor is illuminated (turned on), a microprocessor 1206 reports the position of the line 1204 as the center of that sensor. If two adjacent sensors are each partially illuminated (turned on) by the line 1204 projected by the laser 1202, then the microprocessor 1206 reports the position as the point halfway between the centers of the two photo-sensors. Therefore, the maximum error in position reported by the microprocessor 1206 is d/2. For example, a 5-meter beam 1207 that has a photosensor diameter and array spacing of 5 mm, has a maximum position error of 2.5 mm for the 5-meter length.

Figure 12A:
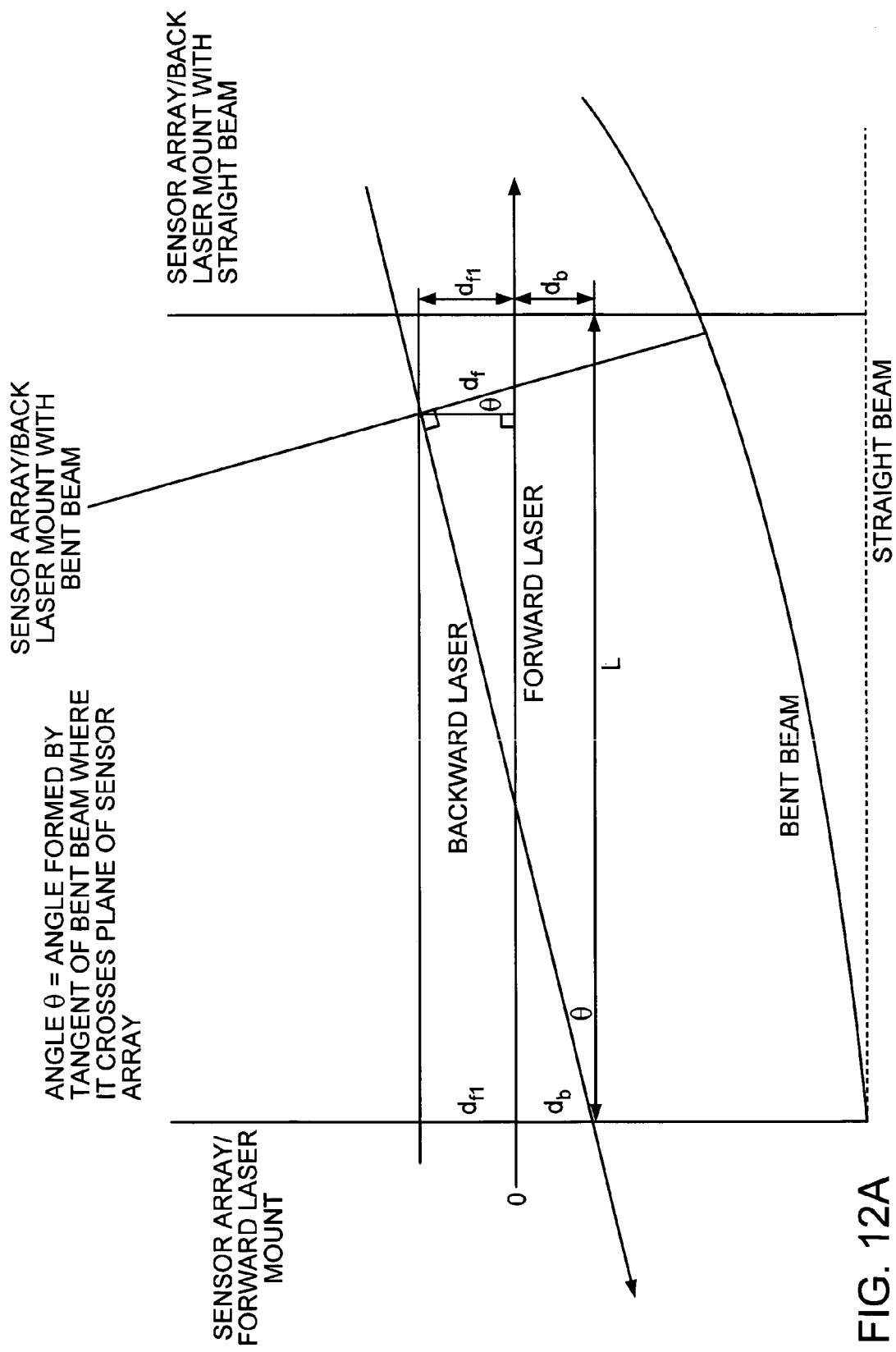
FIG. 12A is a geometric diagram showing calculations used in some embodiments of this invention.

When multiple segments are used to measure bending of a long structure, the total deflection of the structure may be calculated with respect to the root axis by combining the deflections of the segments. Referring to FIG. 12A, the displacement of one end of the segment with respect to the other end is the measured deflection $d_f$, which is where the forward pointing laser hits the sensor array. The angle of each segment with respect to the previous segment is the value of θ from the previous segment. θ is equal to the tangent of the bent beam at the end of the previous segment. Note that this methodology works for uniformly or non-uniformly bent beams. The angle θ may be calculated as:

$$\theta = \arctan[(d_f + d_b)/L]$$

Note that the above formula uses $d_f$ instead of $d_{f1}$, (shown in FIG. 12A), where $$d_{f1} = d_f \cos \theta.$$

Since θ is small, cos θ≈1, allowing this simplifying assumption. In addition, the above formula uses the segment length of the straight beam, while the length of the bent beam is slightly smaller. This results in a small error with small deflections with respect to the segment length. If a configuration is encountered where θ is large enough, or the segment length is small enough to have an impact on accuracy, a numerical solution may be obtained using an iterative process to calculate the variables.

For some beams, in particular, for uniformly bent beams, $d_f = d_b$. For such beams, there is no need to use two counter-directed lasers, as described above. One forward or backward-directed laser with a corresponding sensor array on the opposite end of a segment provide enough information for calculation of deformations in such embodiments.

Figure 13:
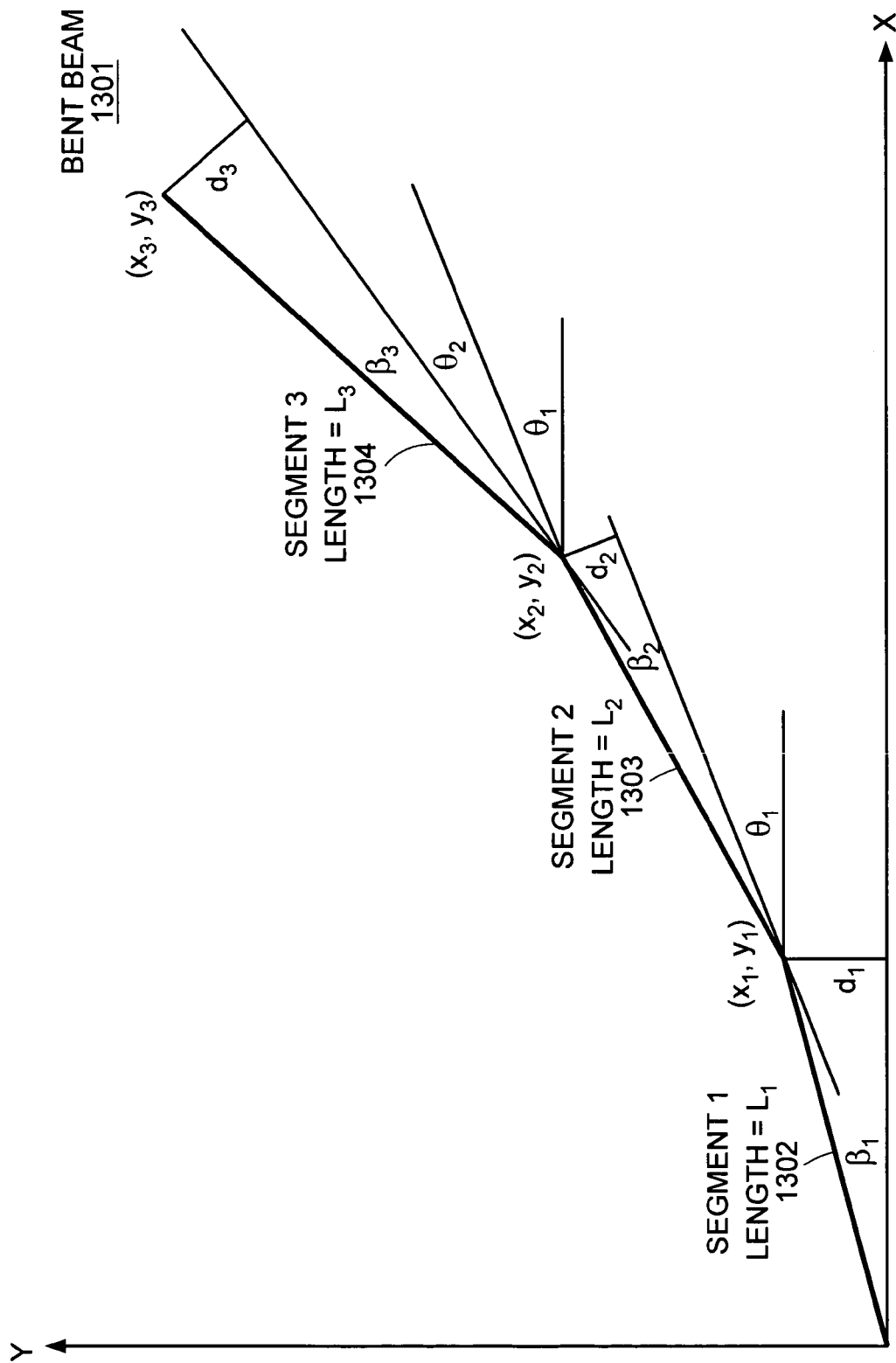
FIG. 13 is an illustration of calculations involved in an embodiment of this invention used on a deflected beam with three sensors.

FIG. 13 shows an embodiment of this invention on a flexible beam 1301 separated into three segments 1302, 1303, and 1304, each of which contains a sensor pair, and showing the orthogonal linear deflection, d, of the endpoints from the local baselines, and the angular deflection, θ.

When sections of sensor/laser pairs are aligned end-to-end as shown in FIG. 9, a computation device calculates the total deflection based on the deflections and angles of all the sections. This may be done using the methods pictorially shown in FIG. 13.

Referring again to FIGS. 12A and 13, the displacement calculation may be described as follows:

Let
  $L_i$=length of segment i,
  $d_{fi}$=deflection of segment i measured using the forward laser
  $d_{bi}$=deflection in segment i measured using the backward laser
  $\theta_i$=tangent angle of beam at end of segment with respect to the beginning of the segment
  $\phi_i$=tangent angle of beam at end of segment with respect to the global coordinate system
  $\beta_i$=angle formed by the deflection of one end of the segment with respect to the other end of the segment
  $x_i$=x position in the root (global) coordinate system at the end of segment i
  $y_i$=y position in the root (global) coordinate system at the end of segment i
  $x_0 = y_0 = \theta_0 = \beta_0 = \phi_0 = 0$
Then:

$$\theta_i = \arctan[(d_{fi} + d_{bi})/L_i]$$

$$\phi_i = \phi_{i-1} + \theta_i$$

$$\beta_i = \arctan(d_{fi}/L_i)$$

$$x_i = x_{i-1} + L_i \cos(\phi_{i-1} + \beta_i)$$

$$y_i = y_{i-1} + L_i \sin(\phi_{i-1} + \beta_i)$$

The X and Y coordinates of any segment of arbitrary lengths and deflections may be calculated using these formulas.

For embodiments where $d_f = d_b$ (e.g., using uniformly bent beams), $d_{fi} + d_{bi}$. For such beams, there is no need to use two counter-directed lasers. One forward or backward-directed laser with a corresponding sensor array on the opposite end of a segment provide enough information for calculation of deformations in such embodiments.

Figure 14:
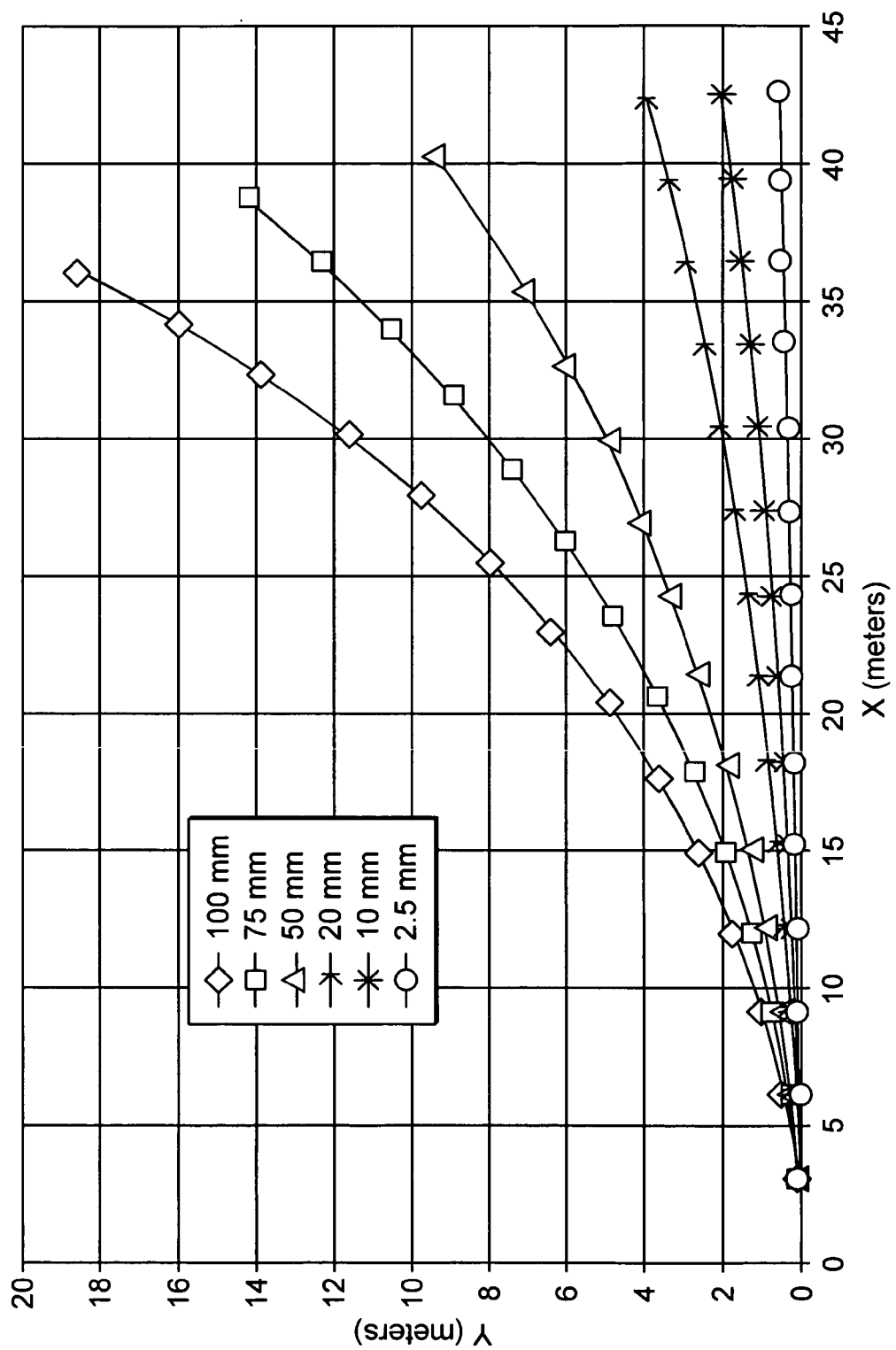
FIG. 14 is a graph showing linear beam shapes with parametric deflections.

FIG. 14 shows for an embodiment of this invention the X, Y coordinates of 14 sections, each 3.048 meters (10 feet) long, with a constant deflection for each section ranging from 2.5 mm to 150 mm. This embodiment is employed on a uniform beam under constant distributed load, held by a cantilever at the origin.

In the undeflected (no bending) case, the 14 segments would lie along the X-axis from 0 to 42.672 meters. For the case of 150 mm bending deflection in each of the 14 sections, the X,Y coordinates of the tip of the last segment are: X=29.2 meters and Y=25.6 meters. FIG. 14 also depicts the worst case resolution error of 2.5 mm discussed above, with a sensor diameter and center-to-center distance of 5 mm. In this case, if the error in each segment is 2.5 mm, the total Y deflection error at the end of the last segment is only 0.480 meters over the beam length of 43 meters. This is an instrument architecture error of only 1.1%. If a CCD sensor array with sensor spacing of 0.0085 mm (300 dots per inch) is used, the total deflection error at the end of the last segment is 0.016 meters, resulting in an instrument architecture error of only 0.03%.

Figure 15:
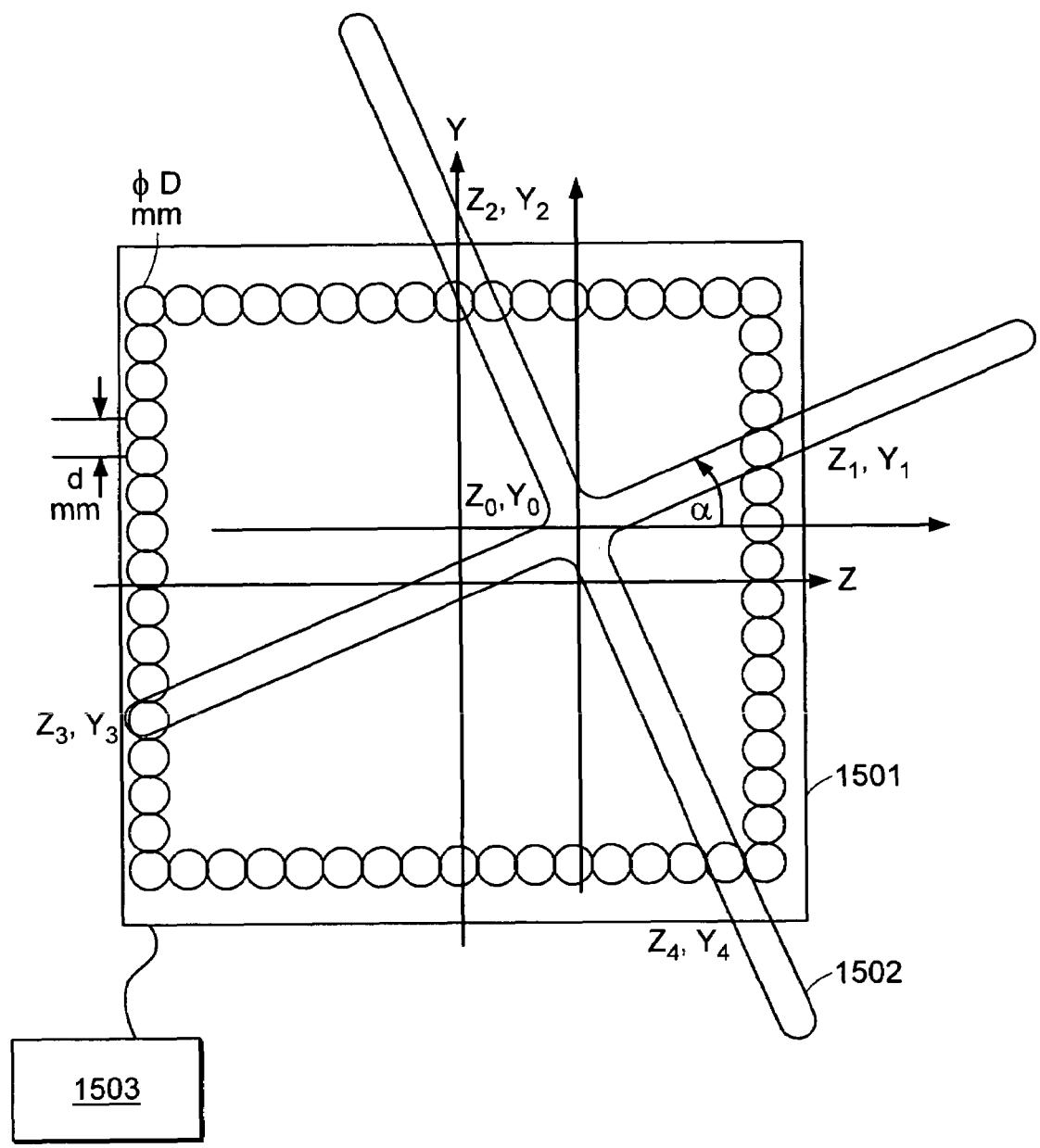
FIG. 15 is a diagram showing the variables used in calculations for three axis laser cross-hairs and sensor target.

In the embodiments of this invention making a three axis measurement (Z, Y, α), a two-dimensional array of sensors is used, such as a square (as shown in FIG. 10), rectangle, circle, or other shape. To resolve the displacements and angles, the laser projects a two-dimensional shape such as a cross-hair or square. FIG. 15 shows a sensor array 1501 with a cross-hair pattern 1502 projected onto it. The cross-hair 1502 is displaced by an amount $Z_0, Y_0$ from the center of the array 1501, and rotated by an angle α. The center-to-center distance between the sensors is d and the sensor diameter is D. A microprocessor 1503 determines the Z, Y coordinates of the four points where the illuminating beam 1502 crosses the sensor array 1503. The sensor array illumination information (i.e., which sensors are turned on) may provide redundant information. This makes possible an internal cross-check on the calculation, because the offsets Z, Y and the angle α may be calculated in two separate ways from the illumination information.

With the z, y coordinates of the four points where the cross-hair intersects the sensor array ($z_1 y_1, z_2 y_2, z_3 y_3, z_4 y_4$) known, the linear z and y deflections may be calculated. This is the point $z_0, y_0$ in the center of the cross-hair 1502. The calculation is done by finding the equations of the two straight lines that make up the cross-hair 1502, and then finding the point where they intersect, as follows:

Equations of the two lines are:

$$y_1 = m_1 z_1 + b_1$$

$$y_2 = m_2 z_2 + b_2$$

Where the line slopes are:

$$m_1 = (y_1-y_3)/(z_1-z_3) \text{ and } m_2 = (y_2-y_4)/(z_2-z_4)$$

At the intersection point, $y_1=y_2=y_0$ and $z_1=z_2=z_0$
Therefore, the center is solved as $$z_0 = (b_2-b_1)/(m_1-m_2) \text{ and } y_0 = m_1 x_0 + b_1$$

The rotation angle α is calculated as $$\alpha = \arctan[(y_1-y_3)/(z_1-z_3)]$$

Figure 16:
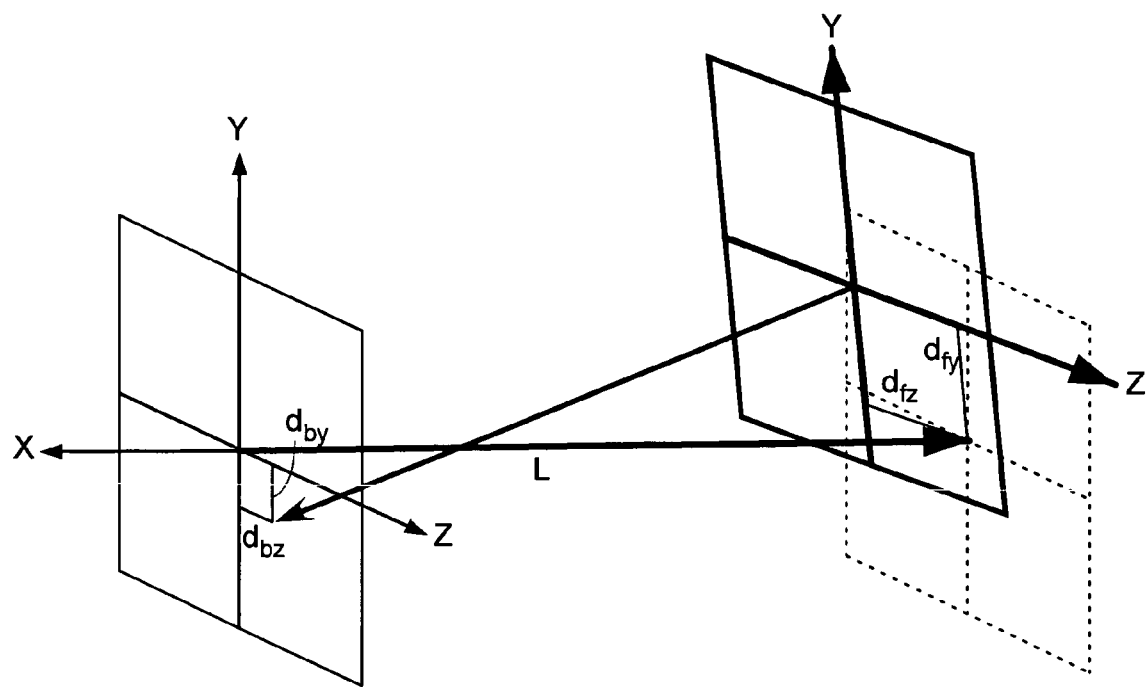
FIG. 16 is a diagram illustrating a three axis measurement.

In some embodiments of this invention, each section has deflections in the Z, Y plane, and rotation about the X-axis (α). FIG. 16 is a simplified view of a single deflected segment. The calculations for the three axis case is an extension of the single axis case described above with coordinate transformations to calculate the deflections of each section with respect to the global coordinate system. For each segment, the deflection in the Y direction, $d_{fy}$, and the displacement in the Z direction, $d_{fz}$, may be calculated using a forward facing laser. The values of $d_{by}$ and $d_{bz}$ may be calculated using a rearward facing laser. From these calculations, the tangent angle (θ) of the bent beam in the Y-X plane at the end of the segment, and the tangent angle (γ) of the bent beam in the Z-X plane at the end of the segment may be calculated as was done in the single axis case above. The x, y, z coordinates at the end of each section, with respect to the global coordinate system, may be calculated by the following method:

1. for each segment calculate $z_0$, $y_0$, and α as shown in FIG. 15;
2. calculate $α_{ti}$ for each segment, which is equal to the sum of the twist angle up to and including segment$_i$;
3. transform the $z_0$ and $y_0$ for each segment from the local coordinate system to the global coordinate system ($y_{seg}$ and $z_{seg}$) using the transformation:

$$y_{segi} = -y_{0i} \cos(\alpha_{ti}) - z_{0i} \sin(\alpha_{ti}) \text{ and}$$

$$z_{segi} = -y_{0i} \sin(\alpha_{ti}) + z_{0i} \cos(\alpha_{ti});$$

4. calculate the x, y, z coordinates of the end of each segment in the global coordinate system $$x_i = x_{i-1} + L_i \cos(\gamma_{i-1}) \cos(\theta_{i-1})$$

$$y_i = y_{i-1} + L_i \cos(\gamma_{i-1}) \sin(\theta_{i-1}) + y_{segi}$$

$$z_i = z_{i-1} + L_i \cos(\theta_{i-1}) \sin(\gamma_{i-1}) + z_{segi}$$

At the end of each segment the photosensor array and the laser are attached to a structure (the mount) which is then attached to the beam to be measured. The mount is rigidly attached to the beam to be measured. When multiple segments are used, each mount has two photosensor arrays and two lasers, one on each side. The master controller computation device accounts for the distance between the photosensor arrays on both sides of the mount. This distance is treated as a non-deflecting and non-twisting (rigid) section in the calculations.

A rigid section (a stinger) may also be attached to the end of the last segment in a multi-segment measurement system to provide a convenient measurement tip. The stinger is then be treated in the calculations as a non-deflecting segment.

Figure 17:
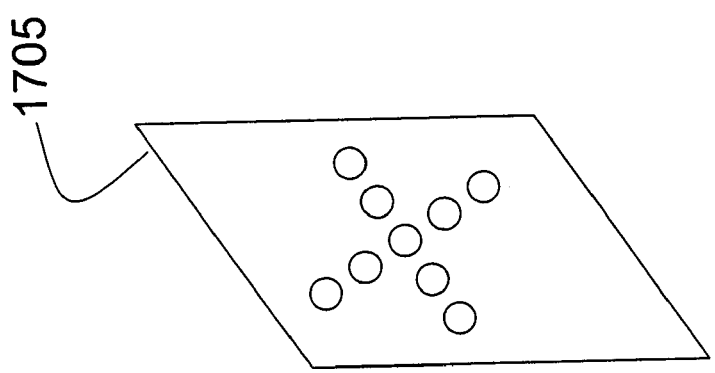
FIG. 17 is a diagram illustrating an electromagnetic radiation focusing device.
Figure 17:
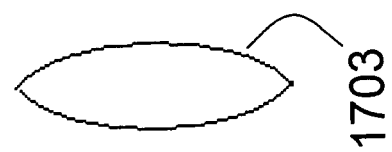
Figure 17:
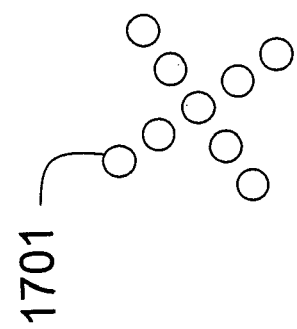

An alternative way to build an embodiment of this invention is to use camera chip 1705 for the sensor array with a lens 1703 that focuses on a specific area, as shown in FIG. 17. Then, instead of lasers at the opposite end, any kind of light source or several light sources 1701, such as LEDs, may be arranged in a pattern such as a crosshair. As the pattern moves in the camera lens's field of view, the displacements between the two ends may be determined. A camera in such embodiments performs the function similar to that of an array of sensors 1501 in other embodiments.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for determining changes in the shape of an object comprising:
    an electromagnetic radiation source coupled to the object, the electromagnetic radiation source emitting a cross-shaped cross-section beam, an array of electromagnetic radiation sensors coupled to the object to receive radiation from the radiation source, responses of the sensors indicating angular orientation of the shaped beam with respect to the array, a processor processing the responses of the sensors to determine a twist of the object.

2. The apparatus of claim 1 wherein the responses of the sensors indicate a displacement of the cross-shaped cross-section beam with respect to the array.

3. The apparatus of claim 1 wherein the electromagnetic radiation source is a laser.

4. The apparatus of claim 1 wherein the electromagnetic radiation source is an electromagnetic-radiation-emitting diode.

5. The apparatus of claim 1 wherein the electromagnetic radiation source comprises at least two electromagnetic radiation sources.

6. The apparatus of claim 1 wherein the processor further processes the responses of the sensors to determine bend of the object.

7. The apparatus of claim 1 wherein the array of electromagnetic radiation sensors is non-linear.

8. The apparatus of claim 1 further comprising an electromagnetic radiation focusing device positioned between the electromagnetic radiation source and the array of electromagnetic radiation sensors.

9. The apparatus of claim 1 wherein the electromagnetic radiation is infrared, visible, or ultraviolet light.

10. The apparatus of claim 1 wherein the object is a blade.

11. The apparatus of claim 1 further comprising
a second electromagnetic radiation source coupled to the object, the second electromagnetic radiation source emitting a second cross-shaped cross-section beam, and
a second array of electromagnetic radiation sensors coupled to the object to receive radiation from the second radiation source, responses of the sensors of the second array indicating orientation of the second cross-shaped cross-section beam with respect to the second array.

12. The apparatus of claim 11 wherein the object is a blade.

13. The apparatus of claim 11 wherein the first cross-shaped cross-section beam and the second cross-shaped cross-section beam are substantially co-directed.

14. The apparatus of claim 11 wherein the first cross-shaped cross-section beam and the second cross-shaped cross-section beam are substantially counter-directed.

15. The apparatus of claim 1 wherein the changes in shape of the object are indicative of flow of a fluid around the object.

16. An apparatus for determining changes in the shape of an object comprising
a first electromagnetic radiation source coupled to the object, the first electromagnetic radiation source emitting a first cross-shaped cross-section beam,
a first array of electromagnetic radiation sensors coupled to the object to receive radiation from the first radiation source, responses of the sensors of the first array indicating angular orientation of the first beam with respect to the first array,
a second electromagnetic radiation source coupled to the object, the second electromagnetic radiation source emitting a second cross-shaped cross-section beam,
a second array of electromagnetic radiation sensors coupled to the object to receive radiation from the second radiation source, responses of the sensors of the second array indicating angular orientation of the second cross-shaped cross-section beam with respect to the second array;
the second radiation source being axially displaced along a length of the object with respect to the first radiation source and the second array of sensors being axially displaced along a length of the object with respect to the first array of sensors to provide a combined indication of changes in the shape of the object, and
a processor processing the responses of the first and the second array of sensors to determine a twist of the object.

17. The apparatus of claim 16 wherein the object is a blade.

18. The apparatus of claim 16 wherein the first beam and the second beam are substantially counter-directed.

19. A blade comprising
an electromagnetic radiation source fixed to the blade, the electromagnetic radiation source emitting a beam, and
an array of electromagnetic radiation sensors fixed to the blade to receive radiation from the radiation source, responses of the sensors indicating orientation of the beam with respect to the array, the orientation indicating bending of the blade.

20. A method for determining changes in the shape of an object comprising:
emitting a cross-shaped cross-section beam from an electromagnetic radiation source coupled to the object,
determining angular orientation, representing twist of the object, of the cross-shaped cross-section beam with respect to an array of electromagnetic radiation sensors coupled to the object to receive radiation from the radiation source, using responses of the sensors; and
providing data indicative of the angular orientation of the beam with respect to the array.

21. The method of claim 20 further comprising determining displacement of the cross-shaped cross-section beam with respect to the array using responses of the sensors.

22. The method of claim 20 wherein the electromagnetic radiation source is a laser.

23. The method of claim 20 wherein the electromagnetic radiation source is an electromagnetic-radiation-emitting diode.

24. The method of claim 20 wherein the electromagnetic radiation source comprises at least two electromagnetic radiation sources.

25. The method of claim 20 further comprising processing the responses of the sensors to determine bend.

26. The method of claim 20 wherein the array of electromagnetic radiation sensors is non-linear.

27. The method of claim 20 further comprising focusing the electromagnetic radiation using a focusing device positioned between the electromagnetic radiation source and the array of electromagnetic radiation sensors.

28. The method of claim 20 wherein the electromagnetic radiation is infrared, visible, or ultraviolet light.

29. The method of claim 20 wherein the object is a blade.

30. The method of claim 20 further comprising
emitting a second cross-shaped cross-section beam from a second electromagnetic radiation source coupled to the object, and
determining orientation of the second cross-shaped cross-section beam with respect to a second array of electromagnetic radiation sensors coupled to the object to receive radiation from the second radiation source, using responses of the sensors of the second array.

31. The method of claim 30 wherein the object is a blade.

32. The method of claim 30 wherein the first cross-shaped cross-section beam and the second cross-shaped cross-section beam are substantially co-directed.

33. The method of claim 30 wherein the first cross-shaped cross-section beam and the second cross-shaped cross-section beam are substantially counter-directed.

34. The method of claim 20 wherein the changes in shape of the object are indicative of flow of a fluid around the object.

35. A method for determining changes in the shape of an object comprising emitting a first cross-shaped cross-section beam from a first electromagnetic radiation source coupled to the object, determining twist of the object from an angular orientation of the first cross-shaped cross-section beam with respect to a first array of electromagnetic radiation sensors coupled to the object to receive radiation from the first radiation source, using responses of the sensors of the first array, emitting a second cross-shaped cross-section beam from a second electromagnetic radiation source coupled to the object, determining twist of the object from an angular orientation of the second cross-shaped cross-section beam with respect to a second array of electromagnetic radiation sensors coupled to the object to receive radiation from the second radiation source, using responses of the sensors of the second array;

the second radiation source being axially displaced along a length of the object with respect to the first radiation source and the second array of sensors being axially displaced along a length of the object with respect to the first array of sensors to provide a combined indication of changes in the shape of the object; and providing data indicative of the twist of the object.

36. The method of claim 35 wherein the object is a blade.

37. The method of claim 35 wherein the first beam and the second beam are substantially counter-directed.

38. A method to determine changes in the shape of a blade comprising emitting a beam from an electromagnetic radiation source fixed to the blade, determining orientation of the beam with respect to an array of electromagnetic radiation sensors fixed to the blade to receive radiation from the radiation source, using responses of the sensors; and providing data indicative of the angular orientation of the beam with respect to the array.

39. An apparatus for determining changes in the shape of an object comprising:

a means for emitting a cross-shaped cross-section beam of electromagnetic radiation, the means for emitting electromagnetic radiation being coupled to the object, and an array of means for sensing electromagnetic radiation, the array being coupled to the object to receive radiation from the means for emitting electromagnetic radiation, responses of the means for sensing electromagnetic radiation indicating orientation of the shaped beam with respect to the array, the orientation representing twist of the object.

40. An apparatus for determining changes in the shape of an object comprising:

a first means for emitting a first cross-shaped cross-section beam of electromagnetic radiation, the first means for emitting electromagnetic radiation being coupled to the object, a first array of means for sensing electromagnetic radiation, the first array being coupled to the object to receive radiation from the first means for emitting electromagnetic radiation, responses of the means for sensing electromagnetic radiation of the first array indicating angular orientation, representing twist of the object, of the first beam with respect to the first array, a second means for emitting a second cross-shaped cross-section beam of electromagnetic radiation, the second means for emitting electromagnetic radiation being coupled to the object, and a second array of means for sensing electromagnetic radiation, the second array being coupled to the object to receive radiation from the second means for emitting electromagnetic radiation, responses of the means for sensing electromagnetic radiation of the second array indicating angular orientation, representing twist of the object, of the second beam with respect to the second array;

the second means for emitting a second cross-shaped cross-section beam of electromagnetic radiation being axially displaced along a length of the object with respect to the first means for emitting a first cross-shaped cross-section beam of electromagnetic radiation and the second array of means for sensing electromagnetic radiation being axially displaced along a length of the object with respect to the first array of means for sensing electromagnetic radiation to provide a combined indication of changes in the shape of the object.

41. A blade comprising a means for emitting a beam of electromagnetic radiation, the means for emitting electromagnetic radiation being fixed to the blade, and an array of means for sensing electromagnetic radiation, the array being fixed to the blade to receive radiation from the means for emitting electromagnetic radiation, responses of the means for sensing electromagnetic radiation indicating orientation of the beam with respect to the array, the orientation indicating bending of the blade.

42. An apparatus for determining flow of a fluid around an object comprising an electromagnetic radiation source coupled to the object, the electromagnetic radiation source emitting a beam, and an array of electromagnetic radiation sensors coupled to the object to receive radiation from the radiation source, responses of the sensors indicating orientation of the beam with respect to the array.

43. A method for determining flow of a fluid around an object comprising emitting a beam from an electromagnetic radiation source coupled to the object, determining orientation of the beam with respect to an array of electromagnetic radiation sensors coupled to the object to receive radiation from the radiation source, using responses of the sensors; and providing data indicative of the angular orientation of the beam with respect to the array.

44. An apparatus for determining flow of a fluid around an object comprising a means for emitting a beam of electromagnetic radiation, the means for emitting electromagnetic radiation being coupled to the object, and an array of means for sensing electromagnetic radiation, the array being coupled to the object to receive radiation from the means for emitting electromagnetic radiation, responses of the means for sensing electromagnetic radiation indicating orientation of the beam with respect to the array.

45. The apparatus of claim 1 wherein the object is a building.

46. The apparatus of claim 1 wherein the object is a bridge.

47. The apparatus of claim 1 wherein the object is a tower.

48. The apparatus of claim 16 wherein the object is a building.

49. The apparatus of claim 16 wherein the object is a bridge.

50. The apparatus of claim 16 wherein the object is a tower.

51. The method of claim 20 wherein the object is a building.

52. The method of claim 20 wherein the object is a bridge.

53. The method of claim 20 wherein the object is a tower.

54. The method of claim 35 wherein the object is a building.

55. The method of claim 35 wherein the object is a bridge.

56. The method of claim 35 wherein the object is a tower.

57. The blade of claim 19 further comprising a processor to process the responses of the sensors to determine a twist of the blade.

58. The blade of claim 19 further comprising:
a second electromagnetic radiation source coupled to the blade, the second electromagnetic radiation source emitting a second beam, and
a second array of electromagnetic radiation sensors coupled to the blade to receive radiation from the second radiation source, responses of the second array of sensors indicating orientation of the second beam with respect to the second array.

59. The blade of claim 19 wherein the beam is a cross-shaped cross-section beam.

60. The method of claim 38 further comprising processing the responses of the sensors to determine a twist of the blade.

61. The method of claim 38 further comprising:
emitting a second beam from a second electromagnetic radiation source coupled to the blade; and
determining orientation of the second beam with respect to a second array of electromagnetic radiation sensors coupled to the blade using responses of the sensors to the second beam.

62. The method of claim 38 wherein the beam is a cross-shaped cross-section beam.

63. An apparatus for determining changes in the shape of an object comprising:
an electromagnetic radiation source coupled to the object, the object being selected from the group consisting of a building, a bridge, and a tower, the electromagnetic radiation source emitting a shaped beam; and
an array of electromagnetic radiation sensors coupled to the object to receive radiation from the radiation source, responses of the sensors indicating angular orientation of the shaped beam with respect to the array.

64. The apparatus of claim 63 further comprising a processor to process the responses of the sensors to determine a twist of the object.

65. The apparatus of claim 63 further comprising:
a second electromagnetic radiation source coupled to the object, .the second electromagnetic radiation source emitting a second beam, and
a second array of electromagnetic radiation sensors coupled to the object to receive radiation from the second radiation source, responses of the sensors indicating orientation of the second beam with respect to the second array.

66. The apparatus of claim 63 wherein beam is a cross-shaped cross-section beam.

\* \* \* \* \*